(12) United States Patent
Takatori et al.

(10) Patent No.: US 7,195,406 B2
(45) Date of Patent: Mar. 27, 2007

(54) INSTANT FILM PACK

(75) Inventors: Tetsuya Takatori, Kanagawa (JP);
Mikio Okajima, Kanagawa (JP);
Katsuyoshi Asakura, Kanagawa (JP);
Tomoyuki Takahashi, Kanagawa (JP);
Toshiharu Naito, Kanagawa (JP);
Kenji Kobayashi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 71 days.

(21) Appl. No.: 10/930,786

(22) Filed: Sep. 1, 2004

(65) Prior Publication Data

US 2005/0047769 A1    Mar. 3, 2005

(30) Foreign Application Priority Data

Sep. 1, 2003    (JP)    ............... 2003-309211

(51) Int. Cl.
*G03B 17/26*    (2006.01)
(52) U.S. Cl. ................... 396/518; 396/527
(58) Field of Classification Search ............. 396/511, 396/517, 518, 527, 528, 30, 34–37
See application file for complete search history.

(56) References Cited

U.S. PATENT DOCUMENTS 3,607,279 A * 9/1971 Gold .................. 396/518
3,999,200 A * 12/1976 Goto .................. 396/518
6,183,144 B1 * 2/2001 Mizuno et al. .......... 396/518
6,195,508 B1 * 2/2001 Katayama et al. ........ 396/32
6,408,134 B2 * 6/2002 Takatori et al. .......... 396/32
6,463,213 B1 * 10/2002 Kitagawa .............. 396/36
6,734,948 B2   5/2004 Futakami et al.
6,802,657 B2 * 10/2004 Mizuno et al. .......... 396/518

FOREIGN PATENT DOCUMENTS

JP    2001-154259 A    6/2001
JP    2001-356423 A    12/2001

* cited by examiner

*Primary Examiner*—W. B. Perkey
*Assistant Examiner*—Rishi S. Suthar
(74) *Attorney, Agent, or Firm*—Sughrue Mion, PLLC

(57) ABSTRACT

An instant film pack includes a plurality of instant photo films. A case contains the instant photo films being stacked. An exit slot is formed in the case, for exiting the instant photo films to an outside of the case one after another. A claw path opening is formed in the case, for receiving insertion of an advancing claw mechanism for advancing the instant photo films by one photo film to move to the exit slot. A thrust preventing flap is disposed on an inside of the exit slot, for closing the exit slot at the middle, to prevent the instant photo films from coming through the exit slot. Furthermore, a light shielding sheet of aluminum foil closes the claw path opening in a light-tight manner, and is released to open the claw path opening upon advance of the advancing claw mechanism.

10 Claims, 28 Drawing Sheets

INSTANT FILM PACK

BACKGROUND OF THE INVENTION

1. Field of the Invention

The present invention relates to an instant film pack. More particularly, the present invention relates to an instant film pack suitable for use with an optical printer for printing an image on an instant photo film.

2. Description Related to the Prior Art

Various types of instant film packs are commercially available, each of which has a case in a quadrilateral shape for containing instant photo films of a mono-sheet type. This is a self-processing photo film unit, of which a photosensitive layer is exposed first. Developing solution contained therein is spread for processing an exposed image, to create the image on the instant photo film. To use the instant photo film, an instant camera is mainly loaded with the instant film pack.

The instant photo films must be kept shielded from light. To prevent unwanted exposure before loading into the instant camera, a light-tight case containing the instant photo films is set into the instant camera. U.S. Pat. No. 6,195,508 (corresponding to JP-A 2000-089351) discloses the use of the case for the instant photo films. The case includes an exposure opening, an exit slot, and a claw path opening. The exposure opening causes a photosensitive surface of the instant photo film to appear. The exit slot is formed for ejecting the instant photo film being exposed. The claw path opening receives entry of an advancing claw mechanism well-known in the art for advancing a first one of the instant photo films in the case toward the exit slot.

In the case, the exposure opening, the exit slot and the claw path opening are closed in various elements. For the exit slot, a light shielding flap of a sheet shape has light-tightness and flexibility, and is attached to an outer side of the exit slot. For the exposure opening, a light shielding cover is used, and sandwiched between the inside of the exposure opening and a first one of the instant photo films. The claw path opening is closed by a light shielding sheet having light-tightness and flexibility. The light shielding sheet has one end attached to the light shielding cover. The light shielding cover is ejected by the advancing claw mechanism from the case when the instant camera becomes loaded with the instant film pack completely. At the same time, the light shielding flap is pushed to open the exit slot. The light shielding sheet at the claw path opening is ejected together from the case.

The instant film pack for use with the conventional camera has a problem in that the instant photo film is likely to thrust and exit accidentally from the exit slot if shock or vibration is given to the instant film pack, for example the instant film pack is dropped on to a floor. To prevent such a problem, a thrust preventing flap is suggested, and attached to inside of the exit slot to close one portion of the exit slot. According to this, the thrust preventing flap is attached and supported on the light shielding cover, which will be ejected and removed from the inside of the case together with the thrust preventing flap.

Furthermore, an optical printer is known in the art to record an image by use of the instant photo film, for example, JP-A 2001-356423 and U.S. Pat. No. 6,734,948 (corresponding to JP-A 2002-221778).

The optical printer according to JP-A 2001-356423 and U.S. Pat. No. 6,734,948 (corresponding to JP-A 2002-221778) is a line printing type in which an image is exposed one line after another with a line-shaped exposure head in feeding the instant photo film. Therefore, the exposure opening at a size of appearance of a large area of the photosensitive side is unnecessary for a case of the instant film pack for use with the optical printer. In JP-A 2001-356423, the exposure opening in the instant film pack has a slot form with a small width. Furthermore, U.S. Pat. No. 6,734,948 (corresponding to JP-A 2002-221778) discloses the optical printer in which a first step is to advance the instant photo film from the case, and a second step is to take an exposure.

If the exposure opening is not formed in the instant film pack at a size of appearance of a large area of the photosensitive side, the light shielding cover is naturally unnecessary. If the light shielding cover is omitted, the thrust preventing flap and the light shielding sheet which would be on the light shielding sheet must be attached to the case. The light shielding sheet and the thrust preventing flap according to the prior art are removed together with the light shielding cover. However, the attachment of the light shielding sheet and the thrust preventing flap on the case results in their remaining state with the thrust preventing flap. It is likely the operation of the advancing claw mechanism and ejection of the instant photo film are seriously influenced by the light shielding sheet and the thrust preventing flap.

SUMMARY OF THE INVENTION

In view of the foregoing problems, an object of the present invention is to provide an instant film pack wherein entry of light to a claw path opening can be prevented, thrust of instant photo films can be prevented, and which is suitable for use with an optical printer for printing an image on the instant photo films.

In order to achieve the above and other objects and advantages of this invention, an instant film pack includes a plurality of instant photo films, a case for containing the instant photo films being stacked, an exit slot, formed in the case, for exiting the instant photo films to an outside of the case one after another, and a claw path opening, formed in the case, for receiving insertion of an advancing claw mechanism for advancing the instant photo films by one photo film to move to the exit slot. Also, a thrust preventing stopper is disposed on an inside of the exit slot, for closing the exit slot at least partially, to prevent the instant photo films from coming through the exit slot.

The thrust preventing stopper includes a flexible sheet having first and second ends, the first end is attached to an inside of the case, the second end is disposed to close the exit slot at least partially, and becomes flexed when pushed by an exiting one of the instant photo films, to open the exit slot.

The case includes a lower panel, the exit slot exits the instant photo films in a sequence nearer to the lower panel, and the instant photo films include a photosensitive surface directed to the lower panel.

In one preferred embodiment, the case includes a lower panel, the exit slot exits the instant photo films in a sequence nearer to the lower panel, and the instant photo films include a photosensitive surface directed opposite to the lower panel.

Furthermore, at least one path light shielding structure closes the claw path opening in a light-tight manner, and is released to open the claw path opening upon advance of the advancing claw mechanism, the path light shielding structure extends toward the exit slot, and has the thrust preventing stopper secured thereto.

According to another aspect of the invention, an instant film pack includes at least one path light shielding structure for closing the claw path opening in a light-tight manner, and for being released to open the claw path opening upon advance of the advancing claw mechanism.

The path light shielding structure is of an easily breakable material, and is attached by adhesion to the claw path opening.

The easily breakable material comprises aluminum foil.

In another preferred embodiment, the easily breakable material comprises a plastic film of which breaking is facilitated in at least one breaking direction, and which is oriented by setting the breaking direction in an advancing direction of the advancing claw mechanism.

In still another preferred embodiment, the claw path opening includes a claw entrance, formed in a rear panel of the case, for allowing entry of the advancing claw mechanism into the case. A claw sliding slot is formed in a lower panel of the case, for allowing advance of the advancing claw mechanism. The path light shielding structure comprises a flexible sheet, and is attached by adhesion to a periphery of the claw sliding slot.

The flexible sheet is attached to the claw sliding slot in an adhesive region disposed to extend in a channel shape, and having portions along three side lines of the claw sliding slot.

In one preferred embodiment, the flexible sheet is attached to the claw sliding slot in at least one adhesive region disposed close to a downstream end of the claw sliding slot downstream with reference to a direction of the advance.

The at least one adhesive region further includes plural spot-shaped adhesive regions arranged along two longer side lines of the claw sliding slot extending in the advancing direction.

In another preferred embodiment, the claw path opening includes a claw entrance, formed in a rear panel of the case, for allowing entry of the advancing claw mechanism into the case. A claw sliding slot is formed in a lower panel of the case, for allowing advance of the advancing claw mechanism. The at least one path light shielding structure includes a light shielding plate movable from a closed position to an open position, for closing the claw sliding slot when in the closed position, and for opening the claw sliding slot when in the open position. A light shielding sheet is secured to the light shielding plate, for closing the claw entrance in a light-tight manner when the light shielding plate is in the closed position, and for opening the claw entrance when the light shielding plate is in the open position. The light shielding plate is moved from the closed position to the open position by the advance of the advancing claw mechanism.

The light shielding plate is slid in the advancing direction of the advancing claw mechanism.

Furthermore, a sliding projection is disposed to project from the light shielding plate, received in the claw sliding slot, for keeping the light shielding plate slidable along the claw sliding slot.

In a further preferred embodiment, furthermore, a retention sheet is attached to a pair of edges of the claw sliding slot, for covering the light shielding plate at least partially along the claw sliding slot, and for keeping the light shielding plate slidable.

In one preferred embodiment, the light shielding plate extends from a first lateral panel of the case to a second lateral panel, and slidable between the lateral panels.

In another preferred embodiment, the light shielding plate is pushed and rotated by the advancing claw mechanism, to open the claw path opening.

In still another preferred embodiment, the light shielding plate has a front end portion, and is kept from moving when the front end portion exited from the exit slot, so as to guide the instant photo films.

BRIEF DESCRIPTION OF THE DRAWINGS

The above objects and advantages of the present invention will become more apparent from the following detailed description when read in connection with the accompanying drawings, in which.

Figure 1:
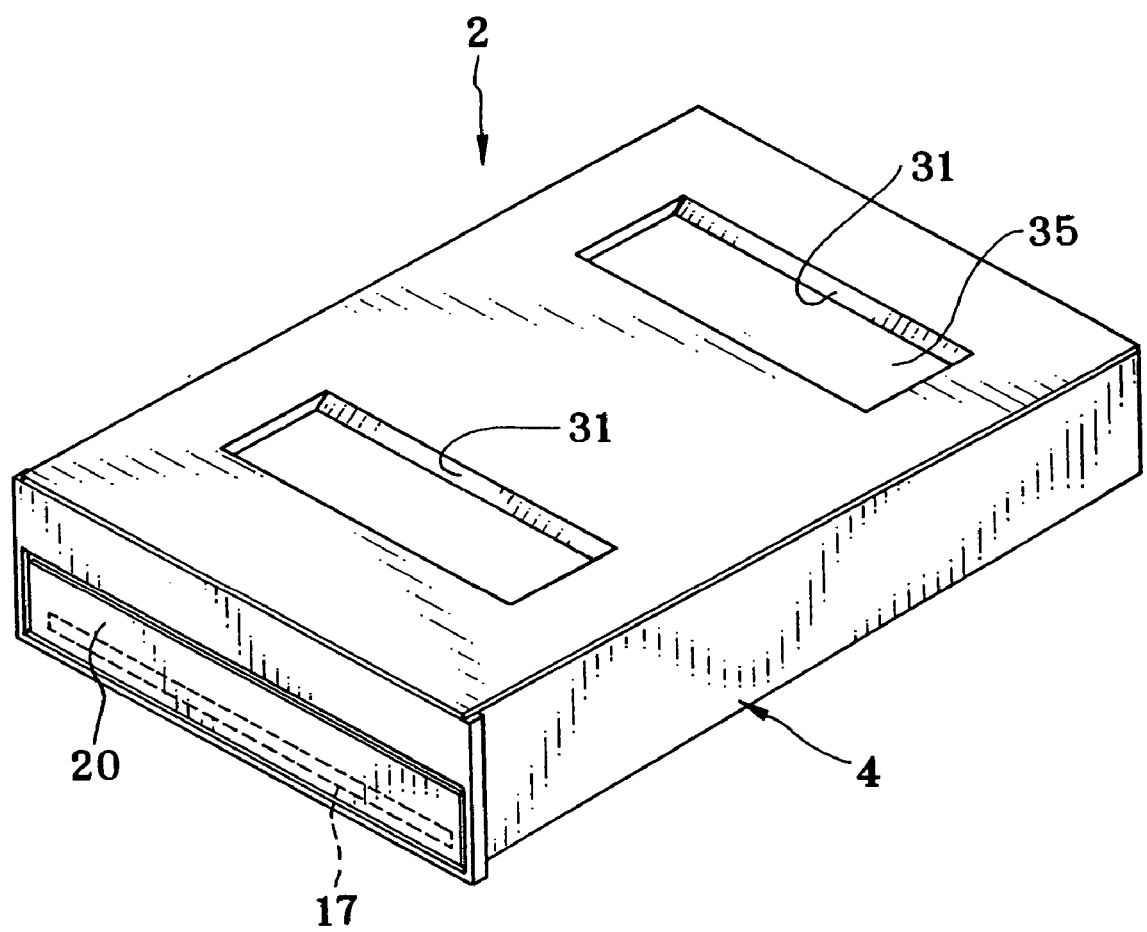
FIG. 1 is a perspective view illustrating an instant film pack.
Figure 2:
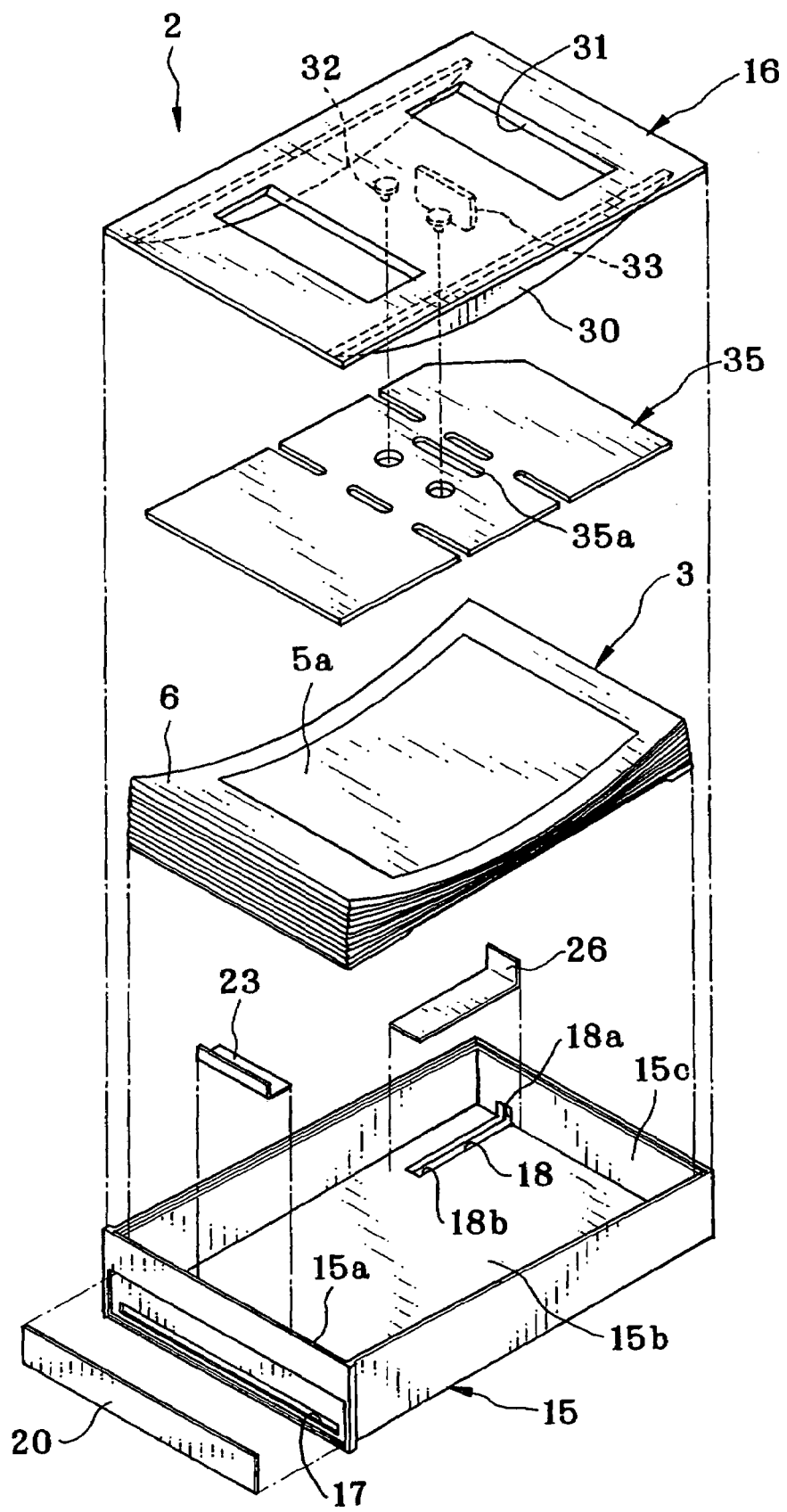
FIG. 2 is an exploded perspective view illustrating the instant film pack.
Figure 3:
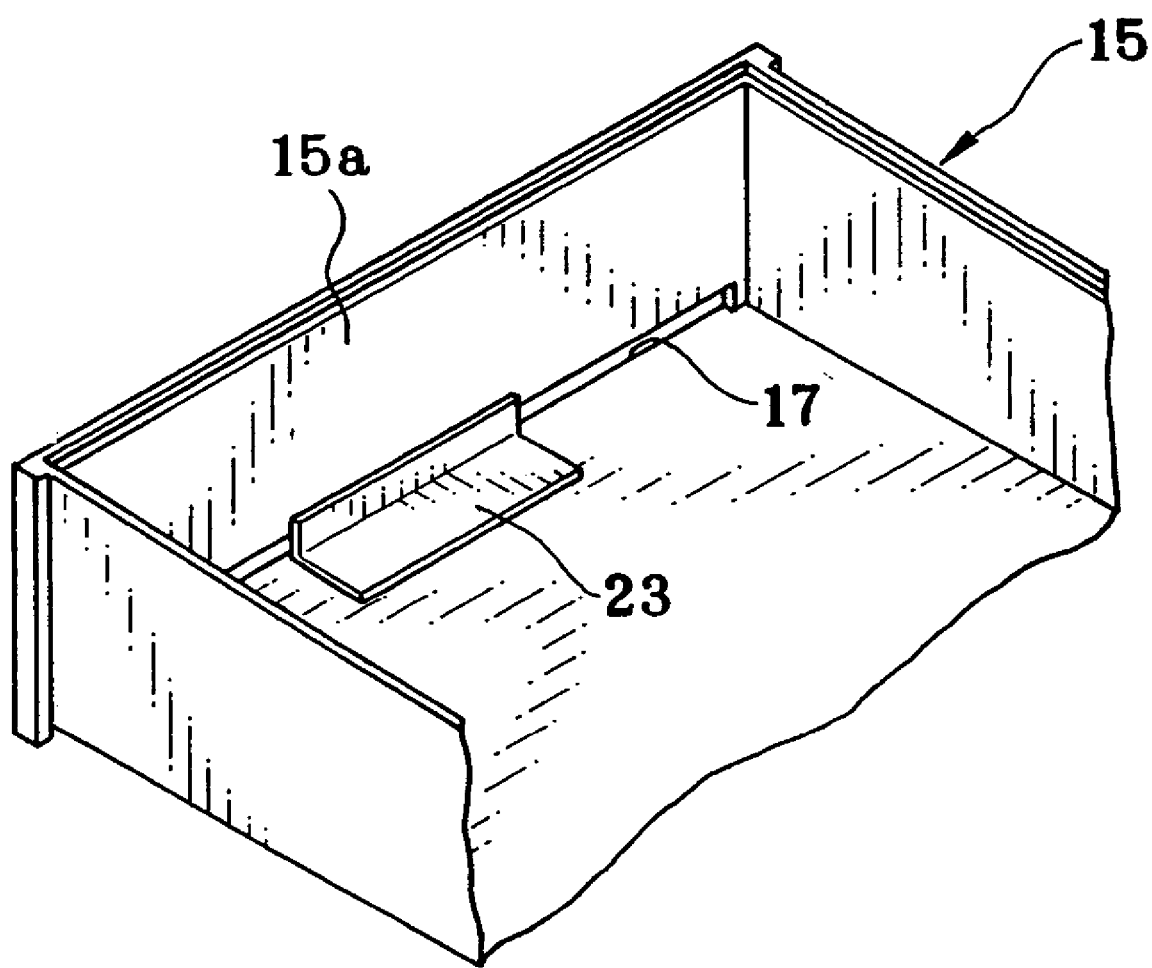
FIG. 3 is a perspective view, partially cutaway, illustrating a front panel of a case.
Figure 4:
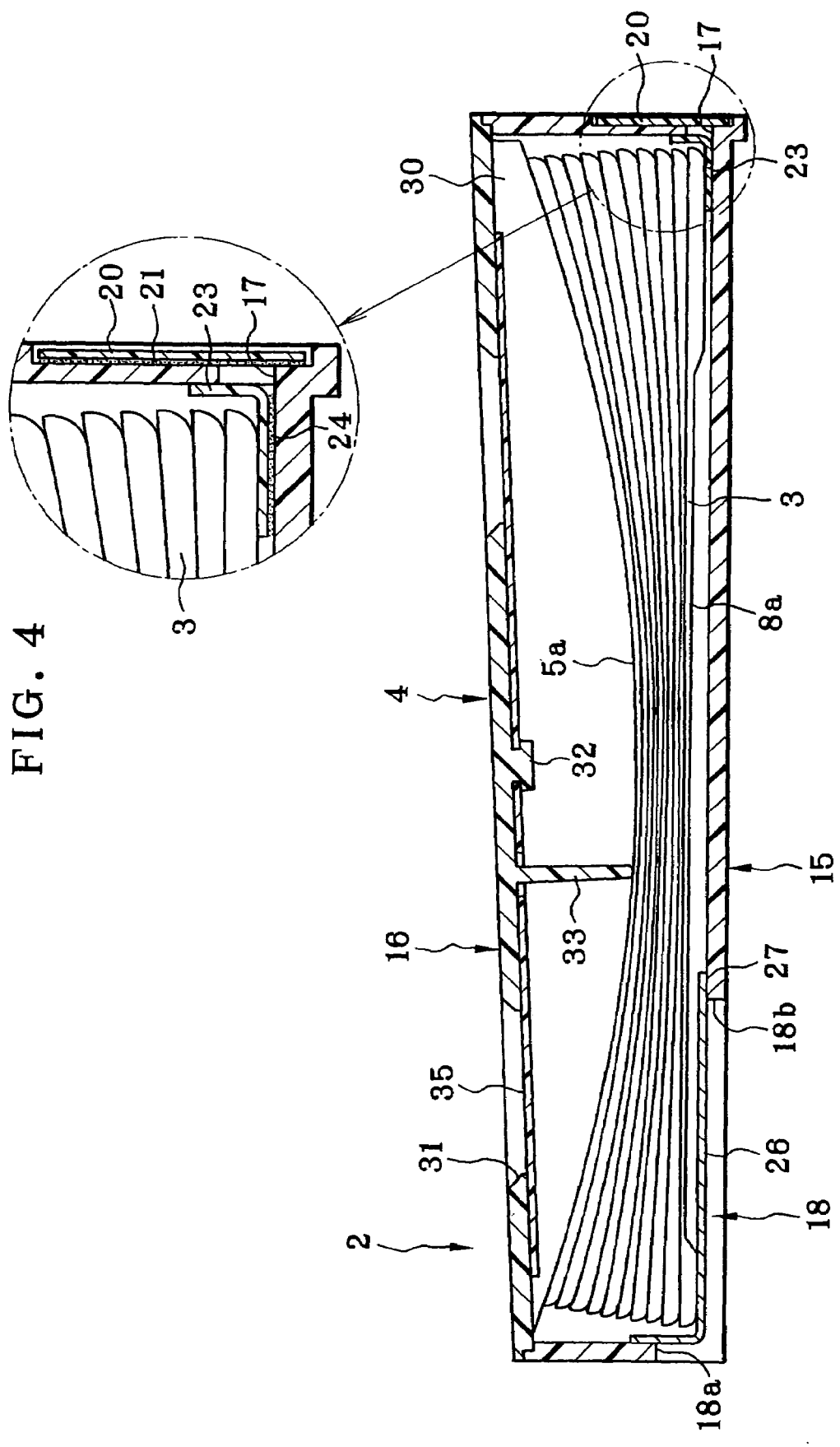
FIG. 4 is a cross section illustrating the instant film pack.

DETAILED DESCRIPTION OF THE
PREFERRED EMBODIMENT(S) OF THE
PRESENT INVENTION

In FIGS. 1, 2, 3 and 4, an instant film pack 2 is illustrated. A case 4 of the instant film pack 2 contains a stack of plural instant photo films 3. Each of the instant photo films 3 is a transmission type of instant photo film, of which a first surface is an exposure surface for being exposed by printing light, and a second surface is opposite to the first surface, and consists of a positive image surface 5a where a positive image is formed and observable to users. In the drawings, the positive image surface 5a is directed upwards. The exposure surface is directed downwards. Also, an edge region 6 of the positive image surface 5a on the left side has a solution pod containing developing solution.

Figure 5:
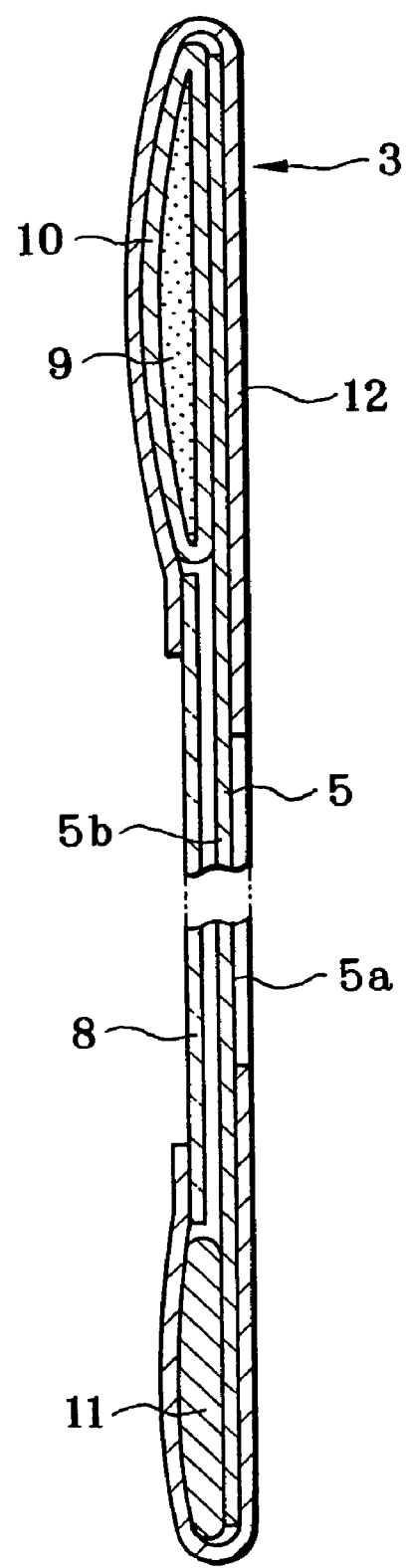
FIG. 5 is a vertical section illustrating an instant photo film.

In FIG. 5, the instant photo films 3 are illustrated in cross section. Each of the instant photo films 3 is constituted by a cover sheet 8, a base sheet 5, a solution pod 10, a solution trap 11, and a mask sheet 12. The cover sheet 8 receives printing light for exposure. The base sheet 5 has the positive image surface 5a. The solution pod 10 contains developing solution 9. The solution trap 11 absorbs and traps a surplus part of the developing solution 9. The mask sheet 12 retains the remaining elements. The cover sheet 8 and the base sheet 5 have high transmittance. The base sheet 5 includes a photosensitive layer 5b, a diffusing/reflecting layer and an image receiving layer.

To print an image, printing light is applied to the base sheet 5, to take an exposure. To develop the image by photographic processing, the solution pod 10 is pressed open by a developing mechanism to be described later. The developing solution 9 is caused to flow into a space between the cover sheet 8 and the base sheet 5. The photosensitive layer 5b comes to have a latent image formed photochemically. The latent image is reversed by a diffusing/reflecting layer, and transferred to an image receiving layer. Thus, a positive image is formed on the positive image surface 5a by the reversing the exposure image.

The case 4 includes a case body 15 and a case lid 16. The case body 15 has an upper opening formed in one of faces of the hexahedron. The case lid 16 is fitted on the upper face of the case body 15, and closes the case body 15. Each of the case body 15 and the case lid 16 is formed from plastic material having light-tightness. A front panel 15a of the case body 15 is provided with an exit slot 17 for ejection of the instant photo film 3 in the direction of advancing the solution pod 10. A claw path opening 18 is formed to extend from a lower panel 15b to a rear panel 15c of the case body 15, and receives insertion of an advancing claw mechanism known in the art for advancing the instant photo film 3 in the case 4 toward the exit slot 17.

A light shielding flap 20 is attached to the outside of the exit slot 17. The light shielding flap 20 is sufficiently flexible, and has light-tightness. Examples of materials for the light shielding flap 20 include polyester, polyethylene terephthalate (PET), or other plastic materials. Adhesive agent 21 is applied to attach the light shielding flap 20 to the case body 15. Because of the adhesion of the adhesive agent 21 of the light shielding flap 20 to the portion except for the periphery of the exit slot 17, the exit slot 17 becomes open when the light shielding flap 20 is pushed by the instant photo film 3 moving to the outside of the case 4.

A thrust preventing flap 23 as stopper is attached for partially closing the exit slot 17 at its center. The thrust preventing flap 23 is formed from plastic material such as polyester and PET, and has an L-shape as viewed in section. Adhesive agent 24 is applied to attach one horizontal portion of the thrust preventing flap 23 to the lower panel 15b of the case body 15. Also, an end of one vertical portion of the thrust preventing flap 23 being bent contacts the front panel 15a at a portion above the exit slot 17.

If considerable shock or shake is abruptly given to the instant film pack 2 due to drop or the like, it is likely that the instant photo film 3 in the case 4 accidentally thrusts to the outside through the exit slot 17. In consideration of this, the thrust preventing flap 23 is used to close the middle portion of the exit slot 17 with its resiliency, to prevent thrust of the instant photo film 3 through the exit slot 17. It is to be noted that the resiliency or rigidity of the thrust preventing flap 23 is at such a level that the instant photo film 3 being moved to the outside of the case 4 pushes and flexes the thrust preventing flap 23, and that its leading end is pushed into the exit slot 17.

A claw entrance 18a is included in the claw path opening 18, disposed in the rear panel 15c of the case body 15, for entry of the advancing claw into the case 4. A claw sliding slot 18b is included in the claw path opening 18, formed in the lower panel 15b, for allowing movement of the advancing claw in the case 4.

A light shielding sheet 26 closes the claw path opening 18 as a path light shielding element, and has light-tightness and flexibility, and easily breakable properties. Adhesive agent 27 is applied to attach the light shielding sheet 26 to edges of the claw path opening 18 in the case body 15. Examples of the light shielding sheet 26 include aluminum foil and a plastic film of which a direction of molecules are regularized for encouraging breakage. Examples of substances of the plastic film include polyester, nylon and the like. At the time of advancing a first one of the instant photo films 3, the light shielding sheet 26 is torn by the advancing claw mechanism. If a plastic film is used for the substance of the light shielding sheet 26, the light shielding sheet 26 is attached by setting the breakage encouraging direction equal to the advancing direction of the claw mechanism.

The case lid 16 has a flat plate shape. A couple of arc-shaped ridges 30 are formed to project from an inner face of the case lid 16 to press two edge portions of the instant photo films 3 in the case body 15, the edge portions extending in the photo film advancing direction. The case lid 16 includes access openings 31, welding pins 32 and a pressing ridge 33 disposed between the arc-shaped ridges 30. When an optical printer is loaded with the instant film pack 2, the access openings 31 receive insertion of a pressing mechanism of the printer. A resilient sheet 35 is attached to the inside of the case lid 16 by welding of the welding pins 32. An insertion slot 35a is formed in the resilient sheet 35, receives insertion of the pressing ridge 33, for pressing down the upper face of the instant photo films 3.

The resilient sheet 35 is a plastic sheet having a small thickness and light-tightness. When the instant film pack 2 is unused, the resilient sheet 35 closes the access openings 31 of the case lid 16 to prevent entry of ambient light into the case 4. When the instant film pack 2 is set in an optical printer to insert tightening ridges through the access openings 31, the tightening ridges flex the resilient sheet 35. The group of the instant photo films 3 is pressed downwards by the force of the tightening ridge and the resiliency of the resilient sheet 35.

Figure 6:
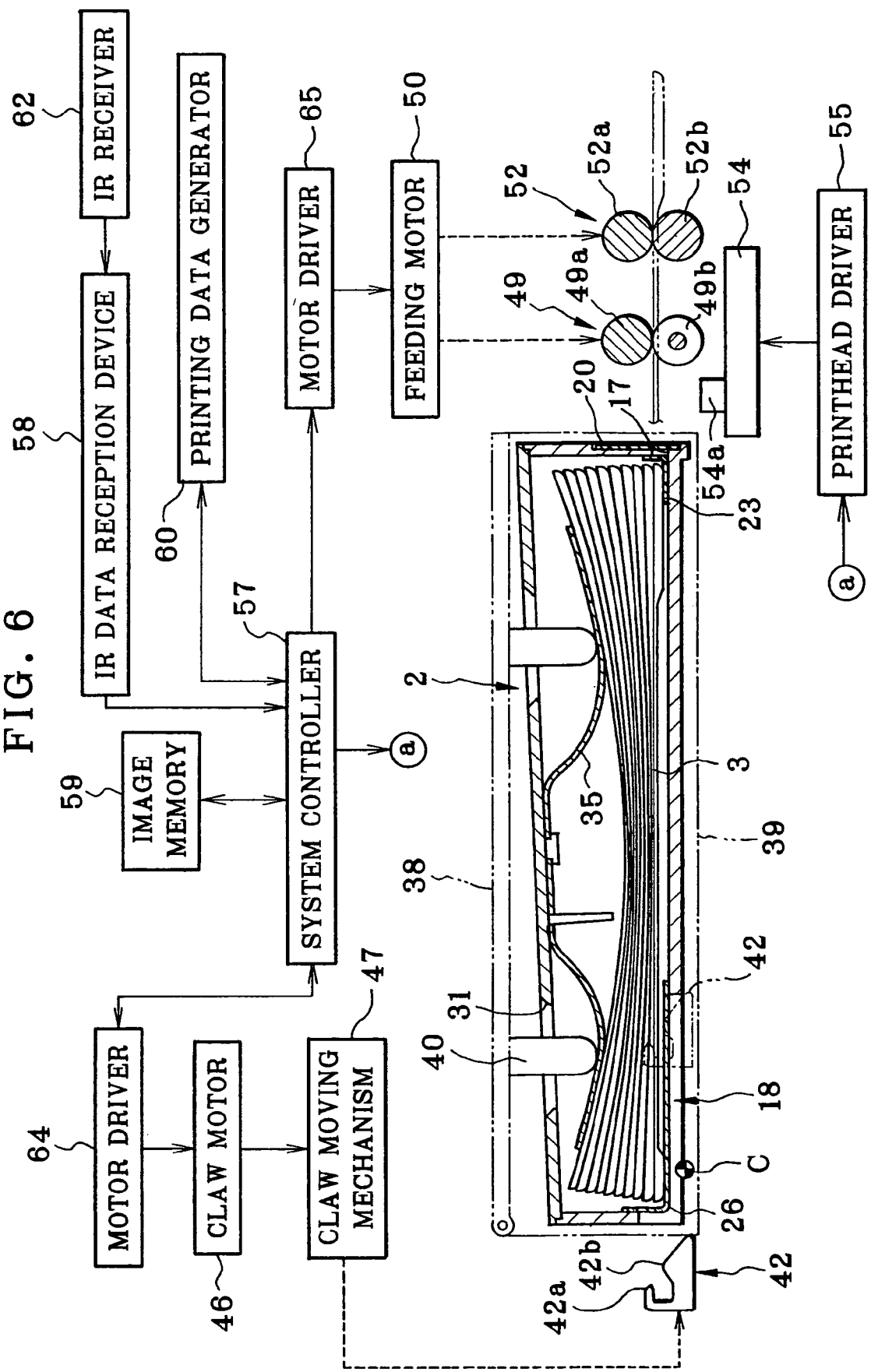
FIG. 6 is a block diagram schematically illustrating an optical printer for use with the instant film pack.

In FIG. 6, an optical printer for use with the instant film pack 2 is illustrated. The printer is installed in a horizontally extending orientation. A pack loading lid 38 is included in the printer, and openable upwards. A pack loading chamber 39 appears when the pack loading lid 38 is open, and used for being loaded with the instant film pack 2. Tightening ridges 40 protrude from the pack loading lid 38, and become inserted in the access openings 31 of the instant film pack 2. Each of the tightening ridges 40 is constituted by an extendable structure (not shown) with a spring. A protruding amount of the tightening ridges 40 becomes greater according to a decrease of the instant photo films 3 in the case 4.

In the present specification, terms of the front and rear are used according to the advance. The front is the side of the front panel 15a of the instant film pack 2, the rear being opposite to the front panel 15a with respect to the instant film pack 2. The optical printer has an advancing claw mechanism 42 in the rear of the pack loading chamber 39, disposed lower, for advancing each of the instant photo films 3 toward the exit slot 17. The advancing claw mechanism 42 includes a separating projection 42a and a squeezing projection 42b. The separating projection 42a advances toward each intermediate position between the instant photo films 3 in the case 4. The squeezing projection 42b squeezes each of the instant photo films 3 between it and the separating projection 42a. Between the separating projection 42a and the squeezing projection 42b is defined a gap which has a thickness slightly greater than a thickness of each of the instant photo films 3.

Figure 7:
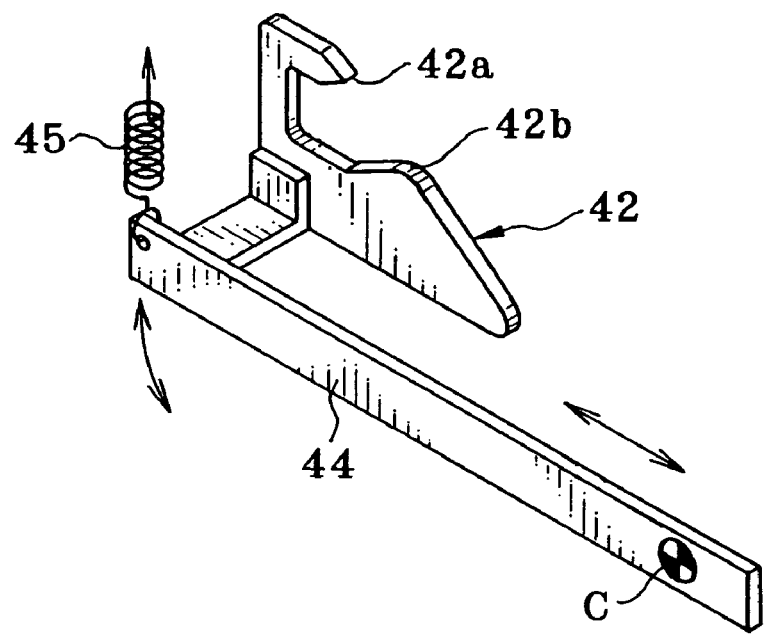
FIG. 7 is a perspective view illustrating an advancing claw mechanism.

In FIG. 7, a movable stay 44 or adjustor supports the advancing claw mechanism 42 fastened thereon. The movable stay 44 extends in the advancing direction of the instant photo film 3 and disposed beside the instant film pack 2. The movable stay 44 is rotatable about a rotational axis C, and also movable back and forth in a path extending in the advancing direction. A tension coil spring 45 biases the movable stay 44 in the clockwise direction of FIG. 6, so the movable stay 44 is retained in an initial stay position. There is a claw motor 46, with which a claw moving mechanism 47 is connected, and converts rotations of the claw motor 46 into horizontal movement. The combination of the claw motor 46 and the claw moving mechanism 47 causes the movable stay 44 to move back and forth in the advancing direction.

In FIG. 6, an initial position of the advancing claw mechanism 42 is depicted. The advancing claw mechanism 42 is moved by the movable stay 44 from the initial position to the advancing position that is indicated by the phantom line and located in the right side. During this movement, the squeezing projection 42b comes to contact a lowest one of the instant photo films 3. The advancing claw mechanism 42 makes a counterclockwise rotation about the rotational axis C. Thus, a level or height of the separating projection 42a is adjusted, for the advancing claw mechanism 42 to capture and move only the lowest one of the instant photo films 3 toward the outside through the exit slot 17.

Figure 8:
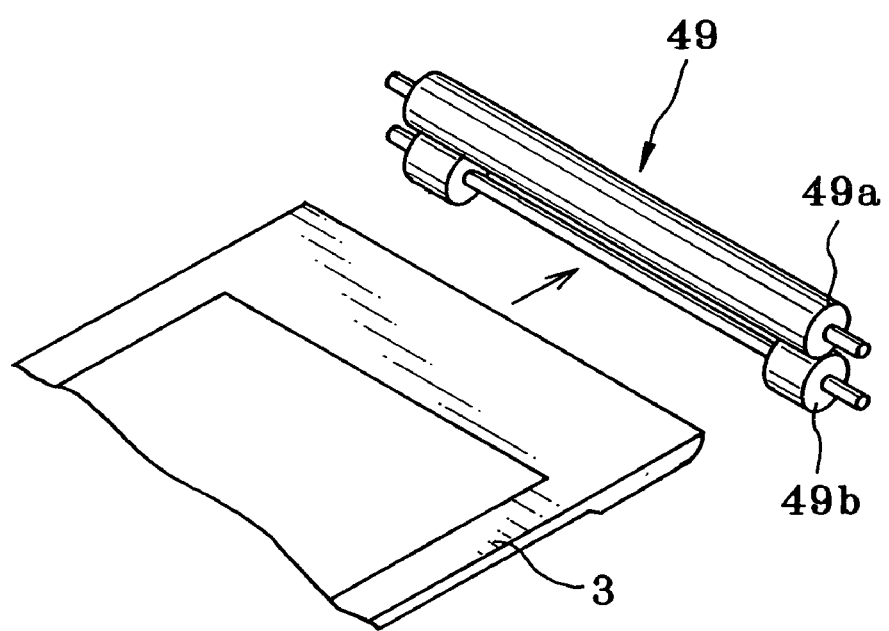
FIG. 8 is a perspective view, partially cutaway, illustrating a pair of feed rollers.

A feed roller set 49 is disposed in front of the pack loading chamber, for moving the instant photo film 3 at a constant speed upon being advanced from the case 4 by the advancing claw mechanism 42. The feed roller set 49 is kept from tearing open the solution pod 10 with high force of pressure. In FIG. 8, an upper roller 49a in the feed roller set 49 has a cylindrical shape or rod shape. A lower roller 49b has a shape to contact only lateral edges of the instant photo film 3. For example, the lower roller 49b includes two side rolls. A feeding motor 50 rotates the lower roller 49b as a connected element in the feed roller set 49. The upper roller 49a is a free roller for being rotated by movement of the instant photo film 3. Also, the upper roller 49a is movable up and down to follow changes in the thickness of the instant photo film 3.

A spreading roller set 52 is disposed in front of the feed roller set 49 for processing the instant photo film 3 by spreading the developing solution. As is well-known in the art, two rollers in the spreading roller set 52 squeeze each of the instant photo films 3 with high pressing force, to tear open the solution pod 10, and cause a flow of the developing solution 9 into a space between the cover sheet 8 and the base sheet 5. The developing solution 9 is thus spread to any of local portions including the trailing end of the instant photo film 3. To this end, the spreading roller set 52 is formed from steel having sufficient hardness for the purpose of ensuring rigidity without flexing even upon occurrence of high pressure. In the spreading roller set 52, an upper roller 52a is a capstan connected with the feeding motor 50, for exerting rotating force. A lower roller 52b is a free element, and caused to rotate by rotation of the upper roller 52a. The lower roller 52b is movable up and down to follow local changes in the thickness of the instant photo film 3, and also is biased in the upward direction by a high biasing force.

An exposure head 54 is disposed between the pack loading chamber 39 and the feed roller set 49, and takes an exposure one line after another with printing light to the photosensitive layer 5b of the instant photo film 3 moved by the feed roller set 49. The exposure head 54 is constituted by light-emitting diodes (LEDs), a printing optical system and a light valve such as an LCD shutter. The light-emitting diodes (LEDs) are groups of three colors of red, green and blue. A printing optical system focuses printing light from the LEDs on a focal plane, where the photosensitive layer 5*b* of the instant photo film 3 is positioned. The light valve such as an LCD shutter intercepts the printing light in a suitable manner. A printing illuminating region 54*a* of the exposure head 54 emits the printing light in an upward direction. A printhead driver 55 drives the exposure head 54.

A system controller 57 controls the entirety of the optical printer. The system controller 57 includes a CPU and a ROM for storing a printing program. Also, an infrared (IR) data reception device 58 is incorporated in the optical printer, for receiving image data from a mobile phone of a digital camera built-in type according to an infrared (IR) wireless communication system. An infrared (IR) signal receiver 62 is connected with the infrared data reception device 58, for externally receiving infrared signals. An image memory 59 is accessed, to which the image data received by the infrared data reception device 58 is written. A printing data generator 60 converts the image data into printing data in a form for the exposure head. The printing data is read and sent to the printhead driver 55, so as to expose the instant photo film 3.

The operation of the above embodiment is described now. In FIG. 6, the pack loading chamber 39 of the optical printer is loaded with the instant film pack 2 at first. The instant film pack 2 in an unused state at the time of the sales is protected from light or moisture by a packaging bag or the like. The instant film pack 2 is removed from the packaging bag before use. The instant photo films 3 are prevented from being exposed, because ambient light is shielded from entry into by the instant film pack 2 by the light shielding flap 20 and the light shielding sheet 26 at the exit slot 17 and the claw path opening 18.

It is likely that a user incidentally drops the instant film pack 2 to a floor before loading an optical printer with the instant film pack 2. However, the thrust preventing flap 23 inside the exit slot 17 prevents the instant photo film 3 from moving toward the exit slot 17 upon occurrence of shock to the case 4. Therefore, the instant photo film 3 can be kept free from accidental exposure.

Then the pack loading lid 38 of the printer is opened, where the pack loading chamber 39 is loaded with the instant film pack 2 after checking the orientation of the same. When the pack loading lid 38 is closed, the tightening ridges 40 inside the pack loading lid 38 enter the access openings 31 of the instant film pack 2, and push down the instant photo films 3 in contact with the resilient sheet 35. A lowest one of the instant photo films 3 comes in tight contact with a lower panel of the case 4, and becomes ready for engagement with the advancing claw mechanism 42. This facilitates ejection of the instant photo films 3 from the exit slot 17.

The power source for the optical printer is turned on by operating a power switch. Then an infrared wireless communication device of the mobile phone is operated, directed toward the infrared signal receiver 62 of the optical printer, and is driven for transmitting data thereto. The system controller 57 of the optical printer responds to the transmission signal input by the infrared signal receiver 62, causes the infrared data reception device 58 to operate, to receive image data according to infrared wireless communication. The image data being received is written to the image memory 59. The printing data generator 60 reads image data from the image memory 59, converts the image data into printing data, which is written to the image memory 59. The printhead driver 55 reads the printing data from the image memory 59, and becomes ready for operation.

Figure 9A:
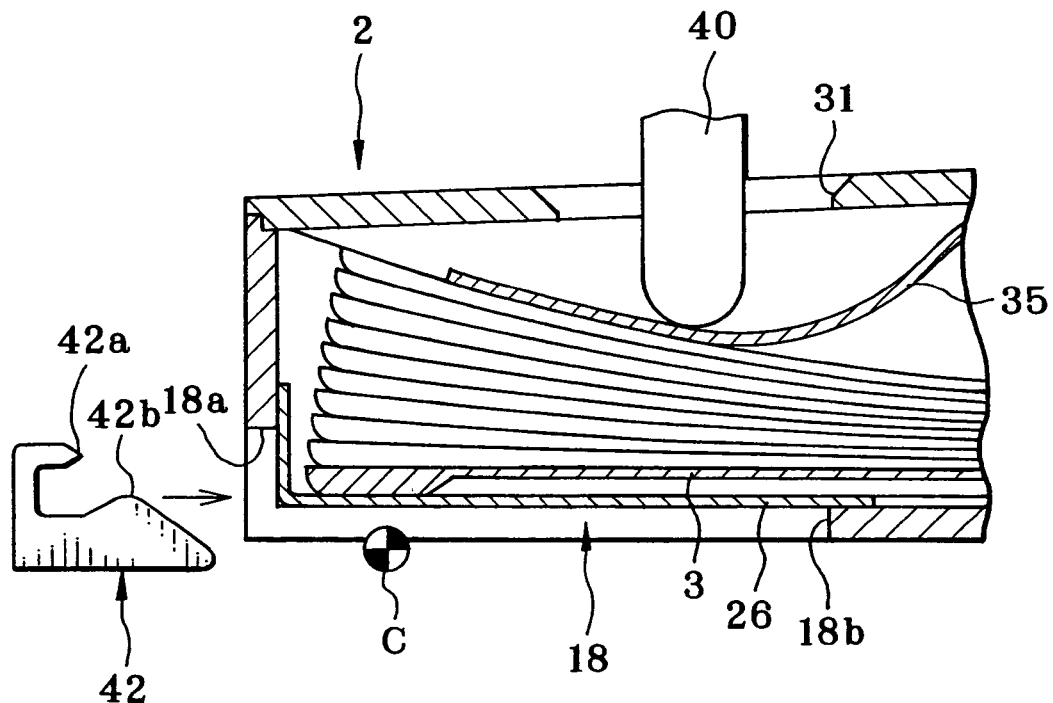
FIG. 9A is an explanatory view in section, illustrating a light shielding sheet in an unused state.
Figure 9B:
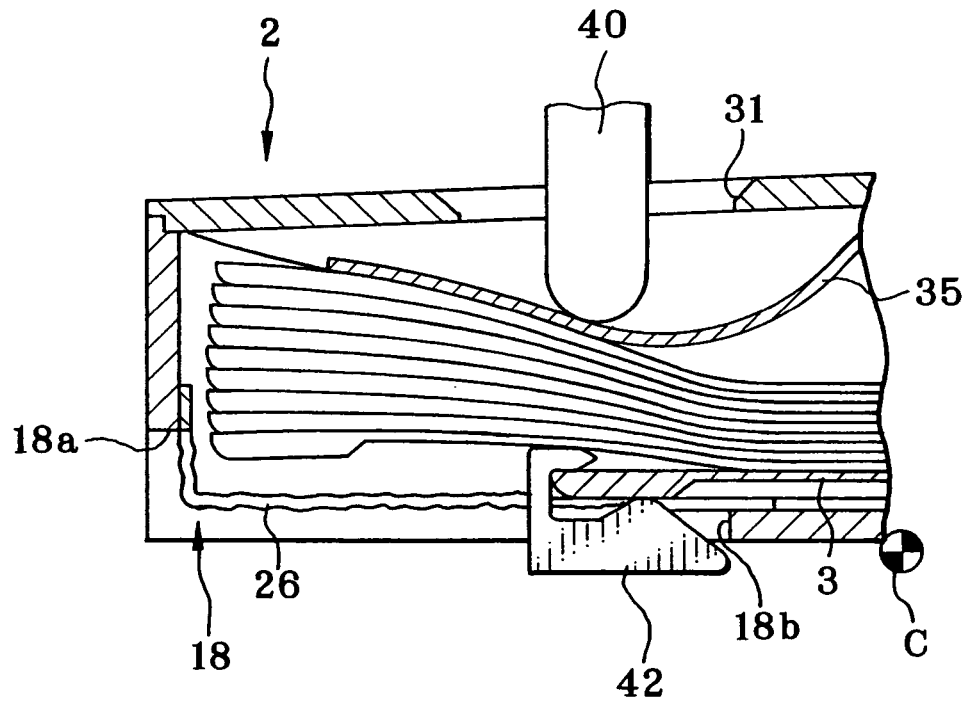
FIG. 9B is an explanatory view in section, illustrating the light shielding sheet in an advancing state.

After the completion of reception of the image data, the system controller 57 controls motor drivers 64 and 65 to drive the claw motor 46 and the feeding motor 50. The advancing claw mechanism 42 starts moving from its first position of FIG. 9A to an advancing position on the right side as depicted in FIG. 9B. The advancing claw mechanism 42 enters the case 4 through the claw entrance 18*a* of the claw path opening 18. The advancing claw mechanism 42 cuts the light shielding sheet 26 extending at the claw path opening 18, is entered in the case 4, and then moves to the advancing position while the light shielding sheet 26 is further cut.

Accordingly, the use of the easily breakable material for the light shielding sheet 26 to close the claw path opening 18 is effective in facilitating the opening operation of the claw path opening 18 with the advancing claw mechanism 42. Also, the easily breakable material becomes cut before the force applied by the advancing claw mechanism 42 is exerted to elements other than the portion of the easily breakable material. Thus, the adhesive region of the light shielding sheet 26 to the case 4 can be kept from peeling. The light shielding sheet 26 does not drop in a failing state, and will not interfere the movement of the advancing claw mechanism 42 or advance of the instant photo films 3.

The squeezing projection 42*b* of the advancing claw mechanism 42 comes in contact with the lowest one of the instant photo films 3 in the course of movement to the advancing position. Thus, the advancing claw mechanism 42 makes a counterclockwise rotation about the center C, to adjust the height of the separating projection 42*a* in association with the lowest one of the instant photo films 3. Only the lowest instant photo film becomes engaged with the advancing claw mechanism 42, and is pushed toward the exit slot 17.

Figure 10A:
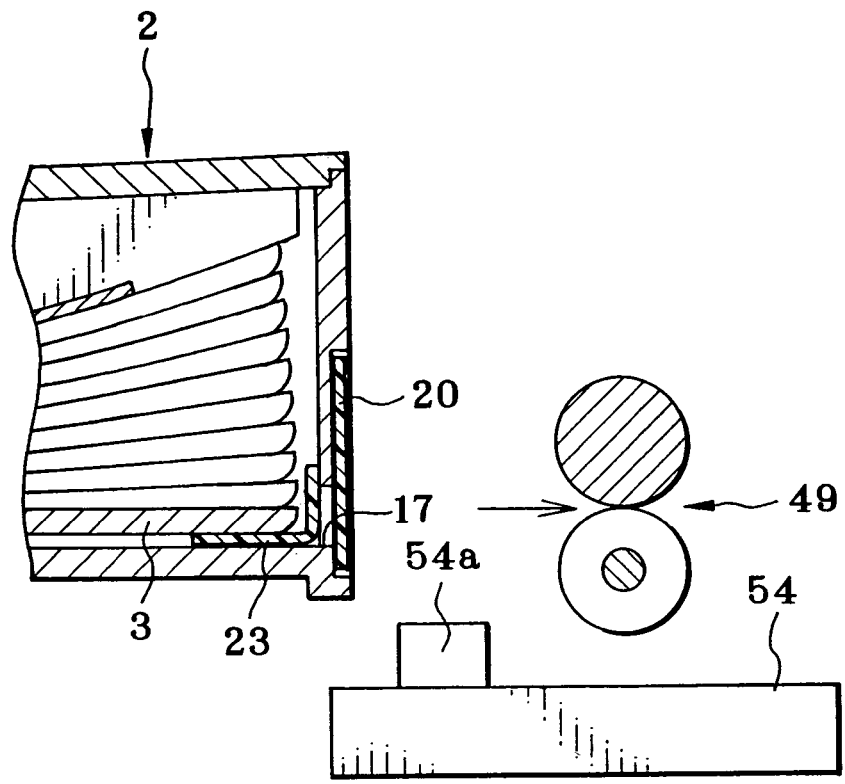
FIG. 10A is an explanatory view in section, illustrating a thrust preventing flap in an unused state.
Figure 10B:
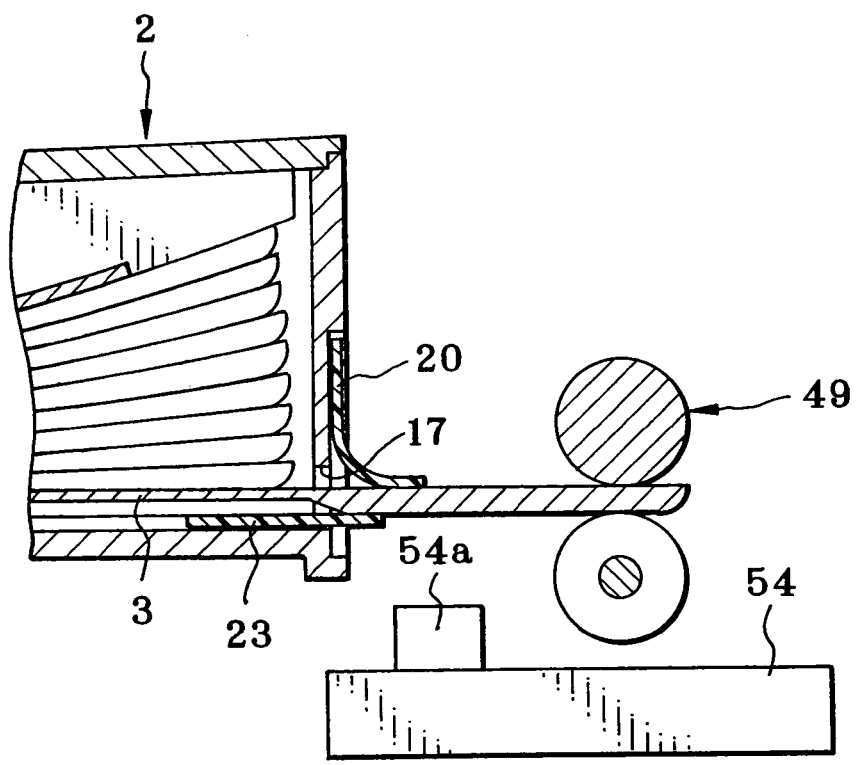
FIG. 10B is an explanatory view in section, illustrating the thrust preventing flap in an advancing state.

In FIG. 10A, a lowest one of the instant photo films 3 is illustrated, and which is moved inside the case 4 toward the front by pressing force of the advancing claw mechanism 42. In FIG. 10B, a leading end of the lowest instant photo film pushes the thrust preventing flap 23. The thrust preventing flap 23 becomes flexed by the lowest instant photo film, for its front edge to enter the exit slot 17. After this, the leading end of the instant photo film 3 pushes and flexes the light shielding flap 20. The lowest instant photo film is moved toward the outside of the case 4 by opening the exit slot 17.

The thrust preventing flap 23 on the case 4 is pushed into the exit slot 17, and directed in the advancing direction of the instant photo film 3. The thrust preventing flap 23 will not block the movement of the instant photo film 3.

The instant photo film 3 advanced by the advancing claw mechanism 42 toward the outside of the case 4 becomes nipped by the feed roller set 49, and is fed at a regular speed. When the photosensitive layer 5*b* comes to the exposure head 54, the printhead driver 55 is controlled by the system controller 57 to drive the exposure head 54, for the printing illuminating region 54*a* to apply printing light to the photosensitive layer 5*b* one line after another. The printing light transmitted through the cover sheet 8 exposes the photosensitive layer 5*b*.

When a leading end of the instant photo film 3 comes to the spreading roller set 52, the instant photo film 3 becomes squeezed by the spreading roller set 52. The spreading roller set 52 tears open the solution pod 10, causes the developing solution 9 to flow into the cover sheet 8 and the base sheet 5, and spreads the developing solution 9 in an regularly thick manner. The photosensitive layer 5*b* in contact with the developing solution 9 is provided with a latent image. The latent image is reversed by the diffusing/reflecting layer, and transferred to the image receiving layer. Note that the spreading roller set 52 is positioned with a distance from the exposure head 54. The developing solution 9 does not flow to a portion of the photosensitive layer before the exposure.

The developing solution 9 having flowed to the space between the cover sheet 8 and the base sheet 5 is trapped or absorbed by the solution trap 11. Then the instant photo film 3 is ejected by the spreading roller set 52 from the inside of the optical printer. At a lapse of predetermined time, a positive image appears on the positive image surface 5*a*.

Figure 11A:
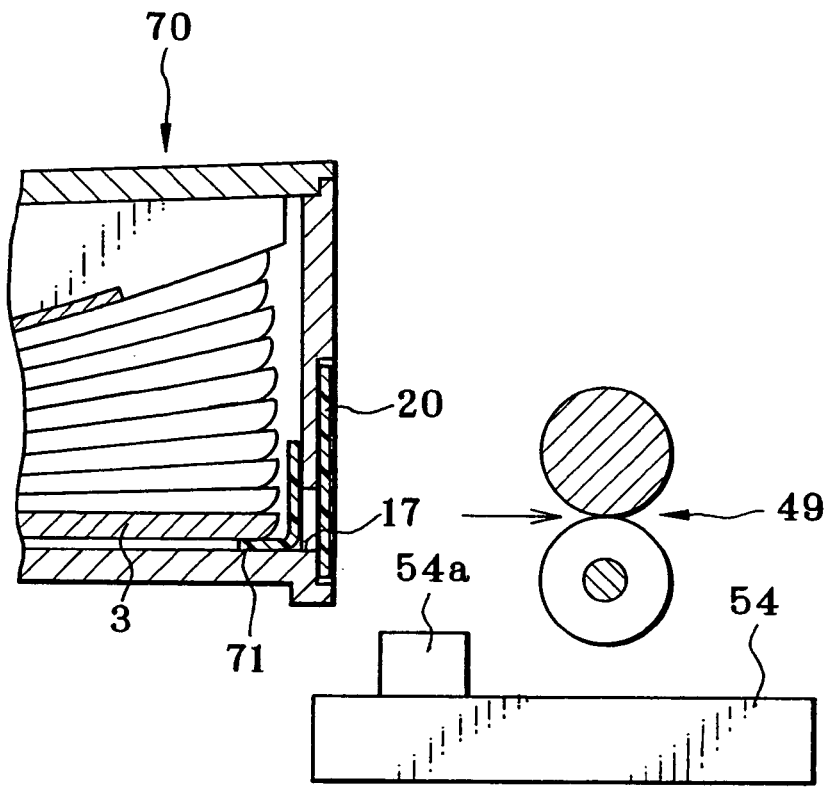
FIG. 11A is an explanatory view in section, illustrating another preferred thrust preventing flap in an unused state.
Figure 11B:
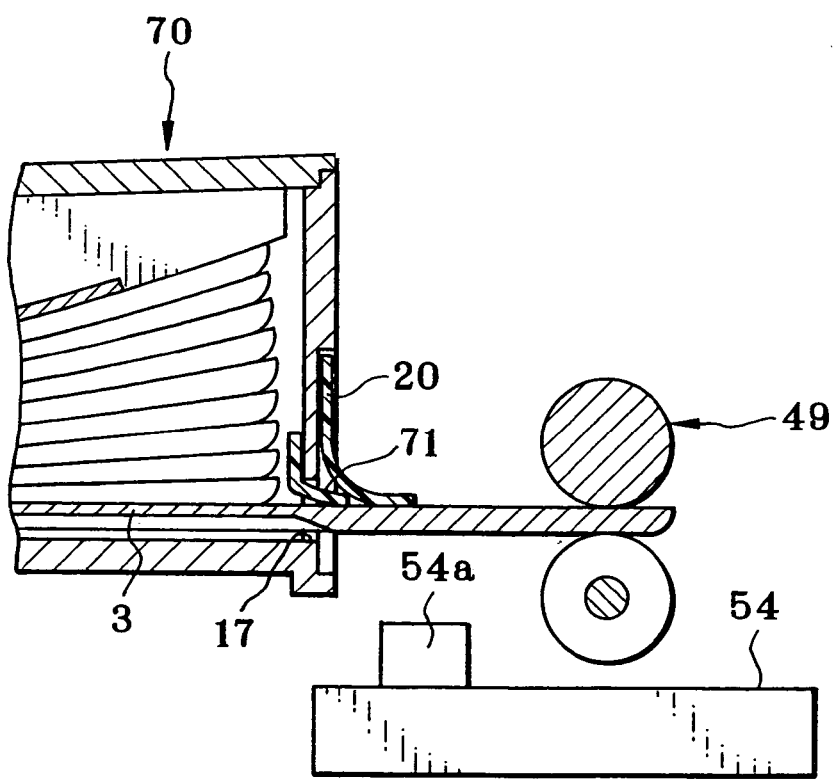
FIG. 11B is an explanatory view in section, illustrating the thrust preventing flap in an advancing state.

Should a protruding amount of the thrust preventing flap 23 be too great from the exit slot 17, interference may occur to exposure of the exposure head 54 to the photosensitive layer 5*b*. To prevent such a problem, another preferred instant film pack 70 is provided. In FIG. 11A, a thrust preventing flap 71 as a stopper has one end attached to the front panel 15*a* of the case body 15. A portion having a second end of the thrust preventing flap 71 is bent in contact with the lower panel of the case body 15. In FIG. 11B, the thrust preventing flap 71 externally protrudes from the exit slot 17 in the course of ejection of the instant photo film 3 and becomes positioned on the upper face of the instant photo film 3. There is no harm to the exposure of the exposure head 54 to the photosensitive layer 5*b*.

Figure 12A:
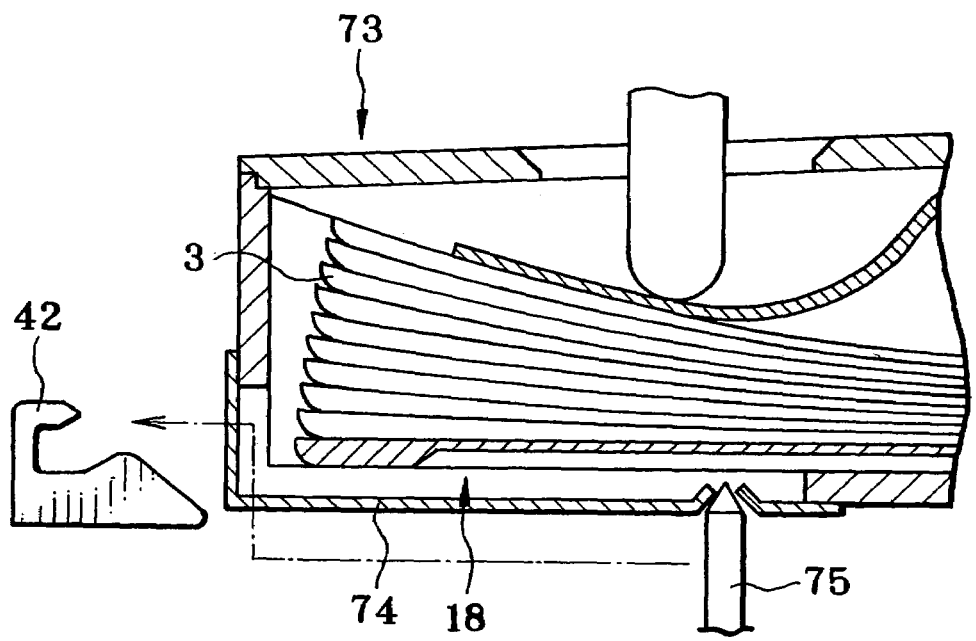
FIG. 12A is an explanatory view in section, illustrating a light shielding sheet in an unused state.
Figure 12B:
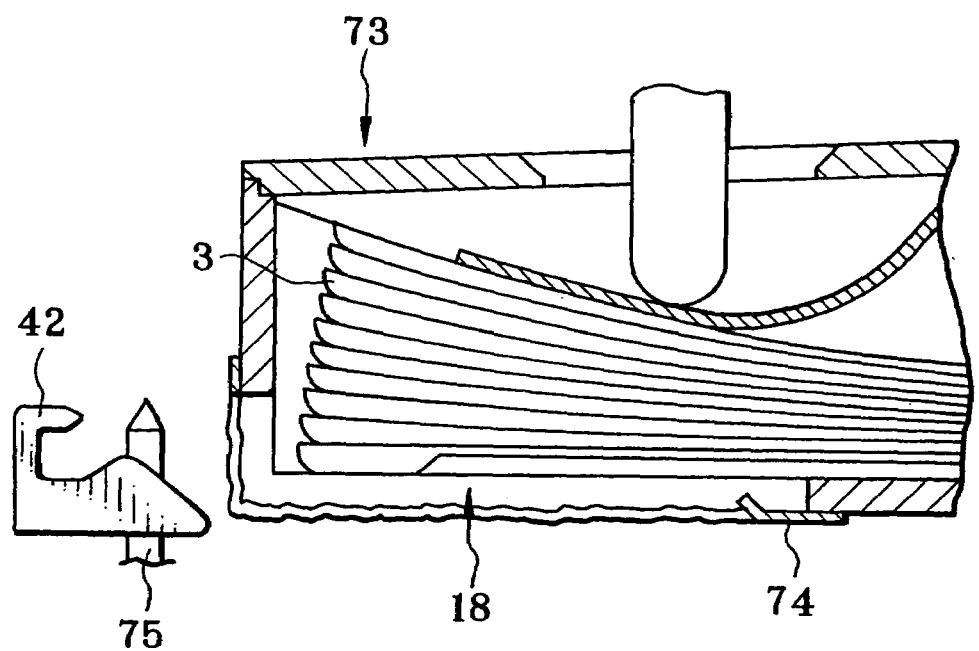
FIG. 12B is an explanatory view in section, illustrating the light shielding sheet in an advancing state.

In FIG. 12A, another preferred instant film pack 73 is illustrated. To prevent interference of a light shielding sheet at the claw path opening 18 with the instant photo film 3, a light shielding sheet 74 is attached to the outside of the case 4 as a path light shielding element. It is possible for the advancing claw mechanism 42 to cut the light shielding sheet 74. Alternatively, a cutting blade 75 other than the advancing claw mechanism 42 may be used as illustrated in FIG. 12B. The cutting blade 75 is moved in the claw path opening 18 to cut the light shielding sheet 74.

Figure 13A:
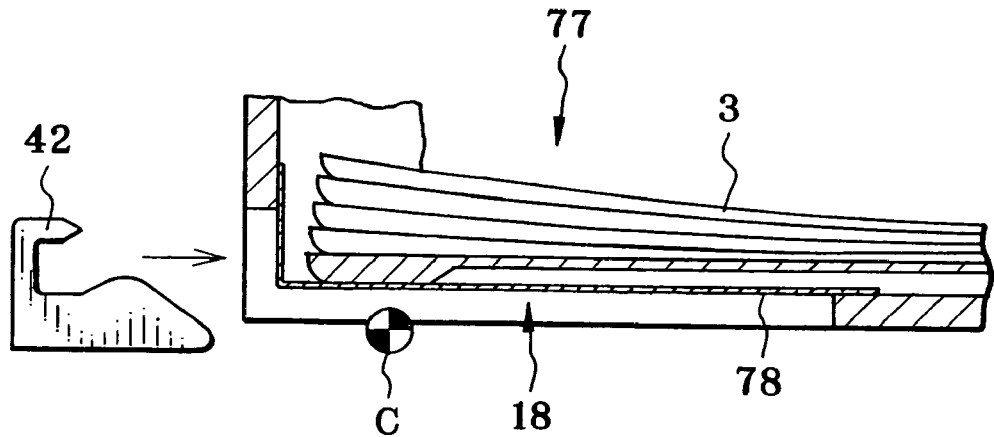
FIG. 13A is an explanatory view in section, illustrating a light shielding sheet in an attached state.

In the above embodiment, the light shielding sheet closes the claw path opening 18 light-tightly, and is formed from easily breakable material. However, it is likely that the light shielding sheet may be broken accidentally at the time of setting to the optical printer. To prevent such a problem, an instant film pack 77 of FIG. 13A is provided. A light shielding sheet 78 is formed from plastic film of a general-purpose type that is not an easily breakable material. The light shielding sheet 78 also can be used for closing the claw path opening 18.

Figure 13B:
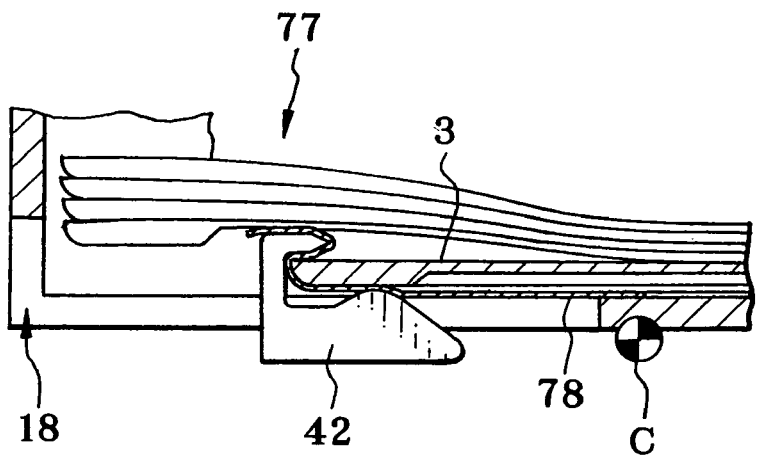
FIG. 13B is an explanatory view in section, illustrating the light shielding sheet in a state during folding.

In FIG. 13B, during the movement of a first one of the instant photo films 3, the light shielding sheet 78 remains uncut despite the existence of the advancing claw mechanism 42. The advancing claw mechanism 42 moves the lowest one of the instant photo films 3 toward the exit slot 17 in a form of squeezing the instant photo film 3 with the light shielding sheet 78. The light shielding sheet 78 remains disposed in the case 4, but flexed and folded by the advancing claw mechanism 42 and the instant photo film 3. See FIG. 13C. Thus, the light shielding sheet 78 will not interfere with movement of the remaining ones of the instant photo films 3.

Figure 13C:
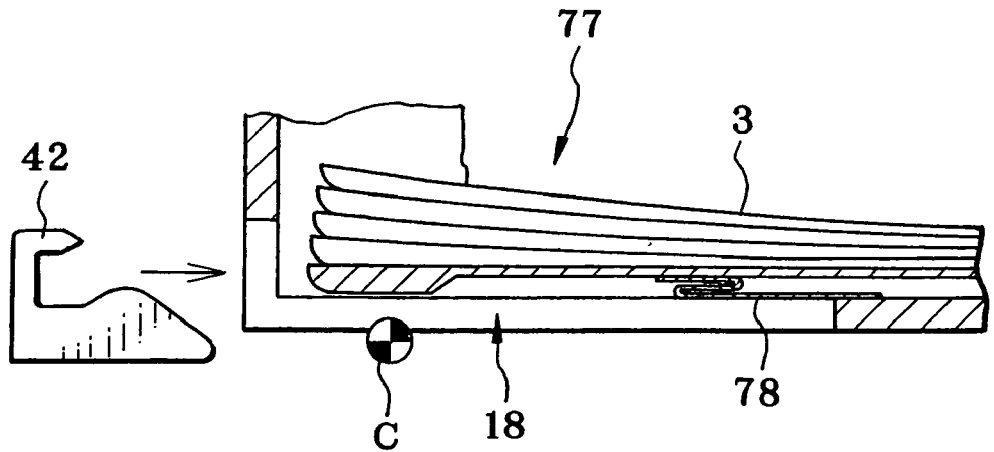
FIG. 13C is an explanatory view in section, illustrating the light shielding sheet in a folded state.

To fold the light shielding sheet 78 in the shape as depicted in FIG. 13C, the light shielding sheet 78 must be bent according to the shape of the advancing claw mechanism 42 and the instant photo film 3 when or before the advancing claw mechanism 42 enters the claw path opening 18, so as to squeeze the instant photo film 3 with the light shielding sheet 78. However, the requirement can be satisfied by suitably determining a state of adhesion of the light shielding sheet 78 to the periphery of the claw path opening 18.

Figure 14A:
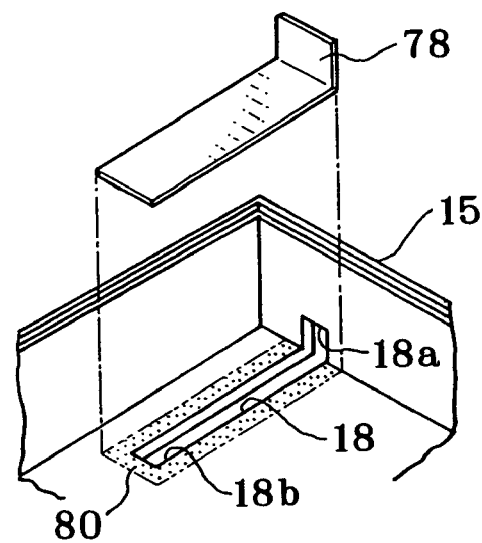
FIG. 14A is a perspective view, partially cutaway, illustrating adhesion of the light shielding sheet.

For example, a peripheral adhesive region 80 is only used for adhesion of the light shielding sheet 78 to the case body 15. See FIG. 14A, where the peripheral adhesive region 80 is defined in association with the claw sliding slot 18*b* of the claw path opening 18. There is no adhesion in a peripheral portion about the claw entrance 18*a*. According to this construction, the degree of freedom of the light shielding sheet 78 can be considerably high upon the entry of the advancing claw mechanism 42 into the claw entrance 18*a*. The light shielding sheet 78 can be flexed by following the advancing claw mechanism 42 and the instant photo film 3.

Figure 14B:
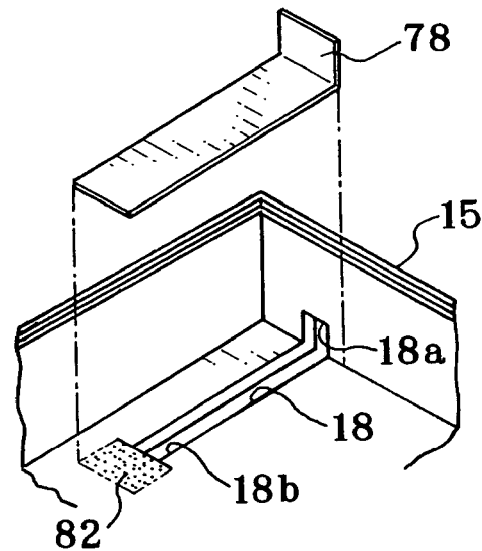
FIGS. 14B and 14C are perspective views, partially cutaway, illustrating adhesion in other adhesive regions with small areas.
Figure 14C:
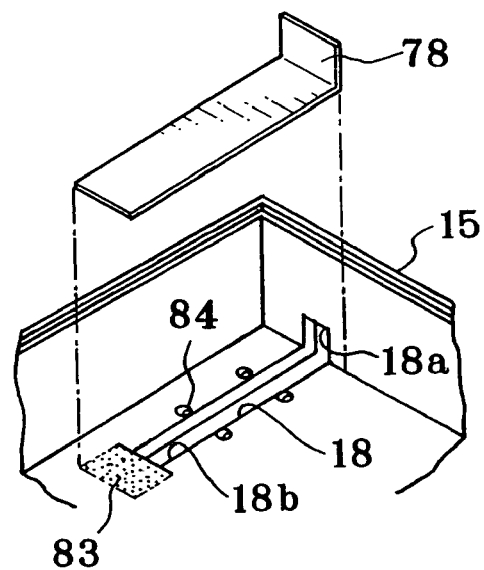

In FIG. 14B illustrates one example of folding the light shielding sheet 78 neatly. An adhesive region 82 is determined at a downstream end of the claw path opening 18 for attachment of a horizontal end of the light shielding sheet 78. In FIG. 14C illustrates another example, in which an adhesive region 83 is determined at the downstream end of the claw path opening 18 for attachment of the horizontal end of the light shielding sheet 78, together with a plurality of spot-shaped adhesive regions 84 are determined for application of adhesive agent for adhesion of the light shielding sheet 78 along edges of the claw path opening 18.

Figure 15:
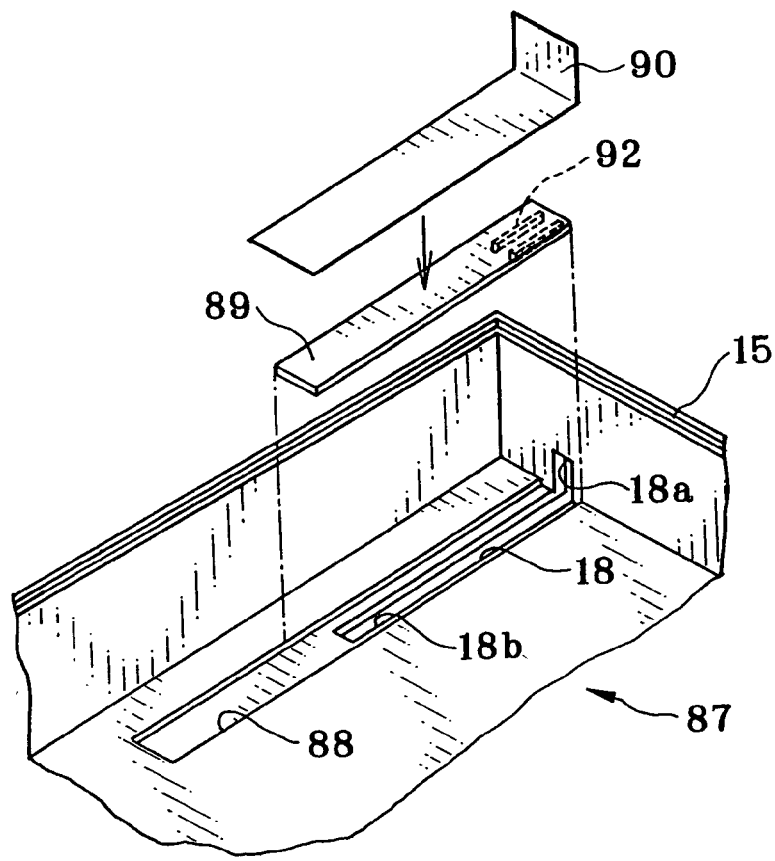
FIG. 15 is a perspective view, partially cutaway, illustrating a light shielding plate slidable for opening the claw path opening.
Figure 16:
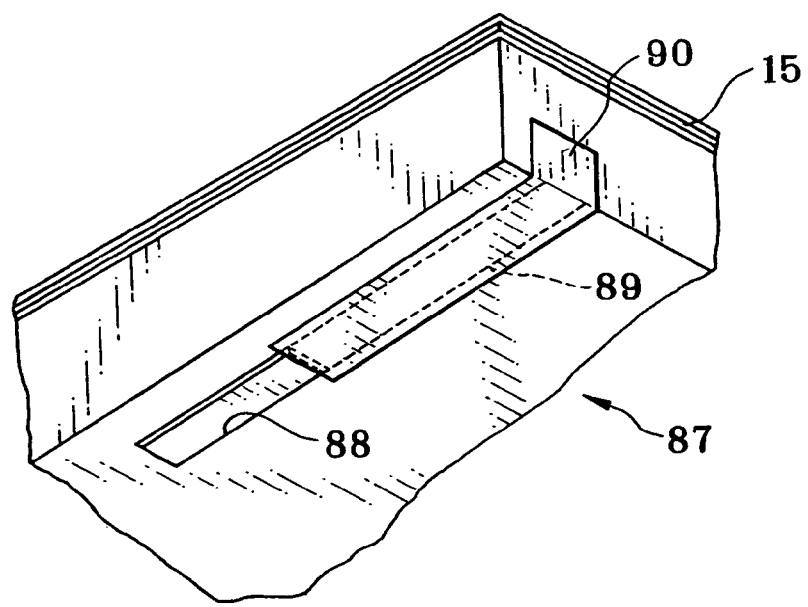
FIG. 16 is a perspective view, partially cutaway, illustrating a closed state of the claw path opening.
Figure 17A:
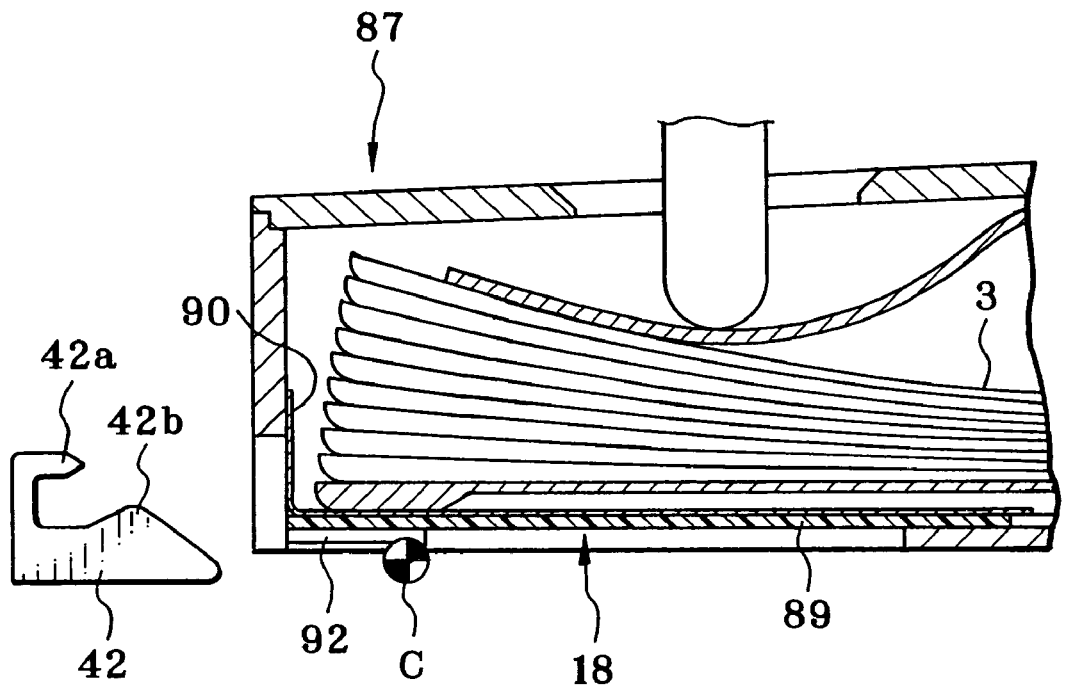
FIG. 17A is an explanatory view in section, illustrating the claw path opening in a closed state.

In each of the above embodiments, the claw path opening is closed by attachment of the light shielding sheet. However, a light shielding plate can be movable to open and close the claw path opening. In FIGS. 15 and 16, an instant film pack 87 is illustrated. A receiving recess 88 is formed in a peripheral portion about the claw sliding slot 18*b* of the claw path opening 18. A light shielding plate 89 or path light shielding element is contained in the receiving recess 88, to close the claw sliding slot 18*b*. The light shielding plate 89 is a plastic plate having light-tightness. A light shielding sheet or skirt 90 is attached to a surface of the light shielding plate 89, and consists of a flexible plastic film having light-tightness. In FIG. 17A, the light shielding sheet 90 is attached to the periphery of the claw entrance 18*a* of the claw path opening 18 to prevent entry of light to the claw entrance 18*a*. Also, the light shielding sheet 90 keeps the periphery of the light shielding plate 89 from entry of light.

Figure 18:
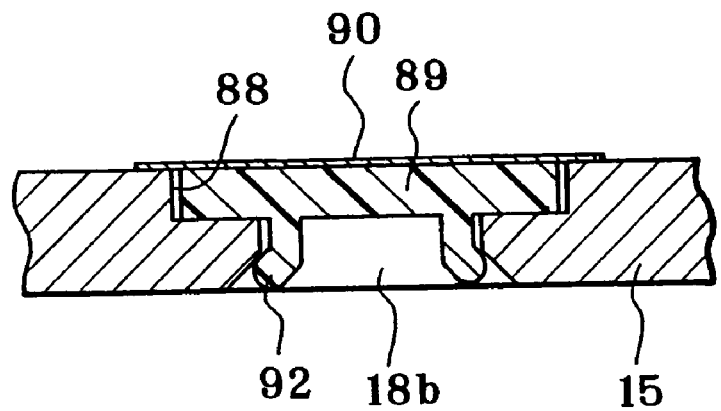
FIG. 18 is an explanatory view in section, illustrating elements viewed crosswise to a sliding direction.

Sliding projections 92 are formed on a lower face of the light shielding plate 89 for being received in the claw sliding slot 18*b* of the claw path opening 18. In FIG. 18, a relationship between the case body 15 and the light shielding plate 89 is illustrated. The sliding projections 92 are directed externally for engagement with the claw sliding slot 18*b*, and prevent the light shielding plate 89 from dropping out of the claw path opening 18. To connect the light shielding plate 89 with the case body 15, the sliding projections 92 can be pushed into the claw sliding slot 18*b* forcibly. The sliding projections 92 are deformed with resiliency and become engaged with the claw sliding slot 18*b*.

Figure 17B:
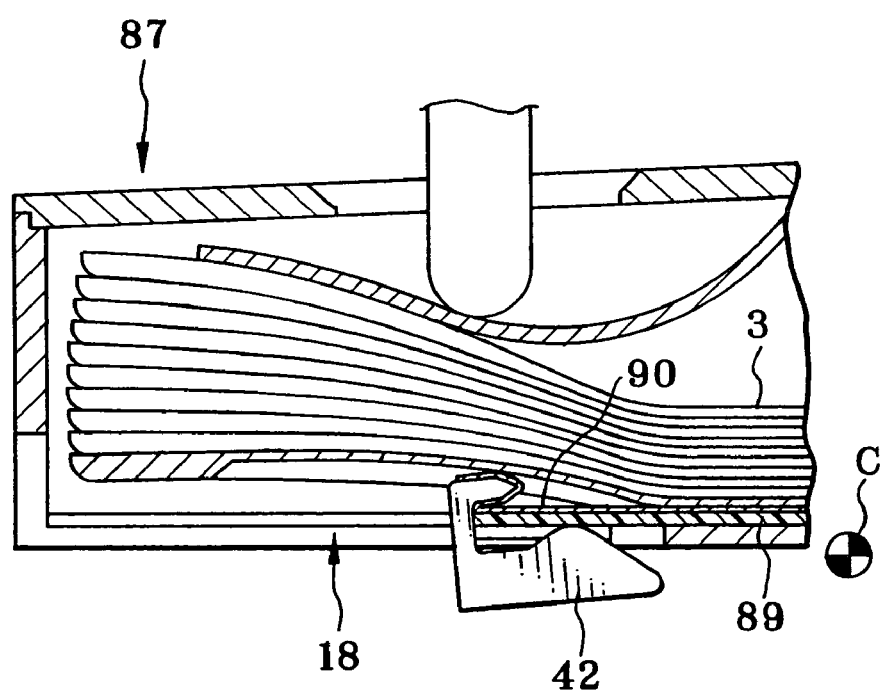
FIG. 17B is an explanatory view in section, illustrating the claw path opening in an open state.
Figure 19:
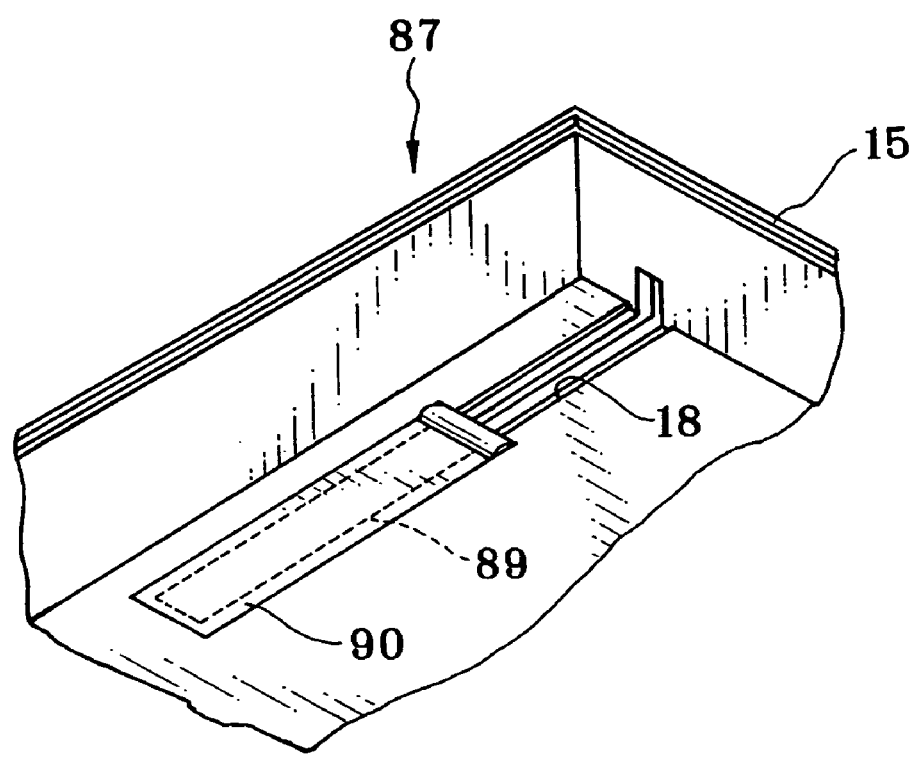
FIG. 19 is a perspective view, partially cutaway, illustrating the claw path opening in an open state.

In FIG. 17B, only the light shielding plate 89 and the light shielding sheet 90 in the instant film pack 87 are engaged with the advancing claw mechanism 42 upon the initial movement, and are advanced toward the exit slot. Thus, the claw path opening 18 is opened as illustrated in FIG. 19. The light shielding sheet 90 is folded by the advancing claw mechanism 42 and the instant photo film 3 in a manner similar to the light shielding sheet 78 described according to the above embodiment. The light shielding plate 89 will not break unlike the light shielding sheet, and is capable to prevent entry of light in a more reliable manner.

Note that the light shielding plate 89 has a considerably smaller thickness than the instant photo film 3. However, the light shielding plate 89 and the instant photo film 3 are not advanced simultaneously by the advancing claw mechanism 42. This is because there is no gap between the separating projection 42a and the squeezing projection 42b of the advancing claw mechanism 42 for simultaneous engagement with the instant photo film 3 and the light shielding plate 89. Also, the squeezing projection 42b contacts the light shielding plate 89 to rotate the advancing claw mechanism 42, so as to adjust the height of the separating projection 42a in compliance with the light shielding plate 89.

Figure 20:
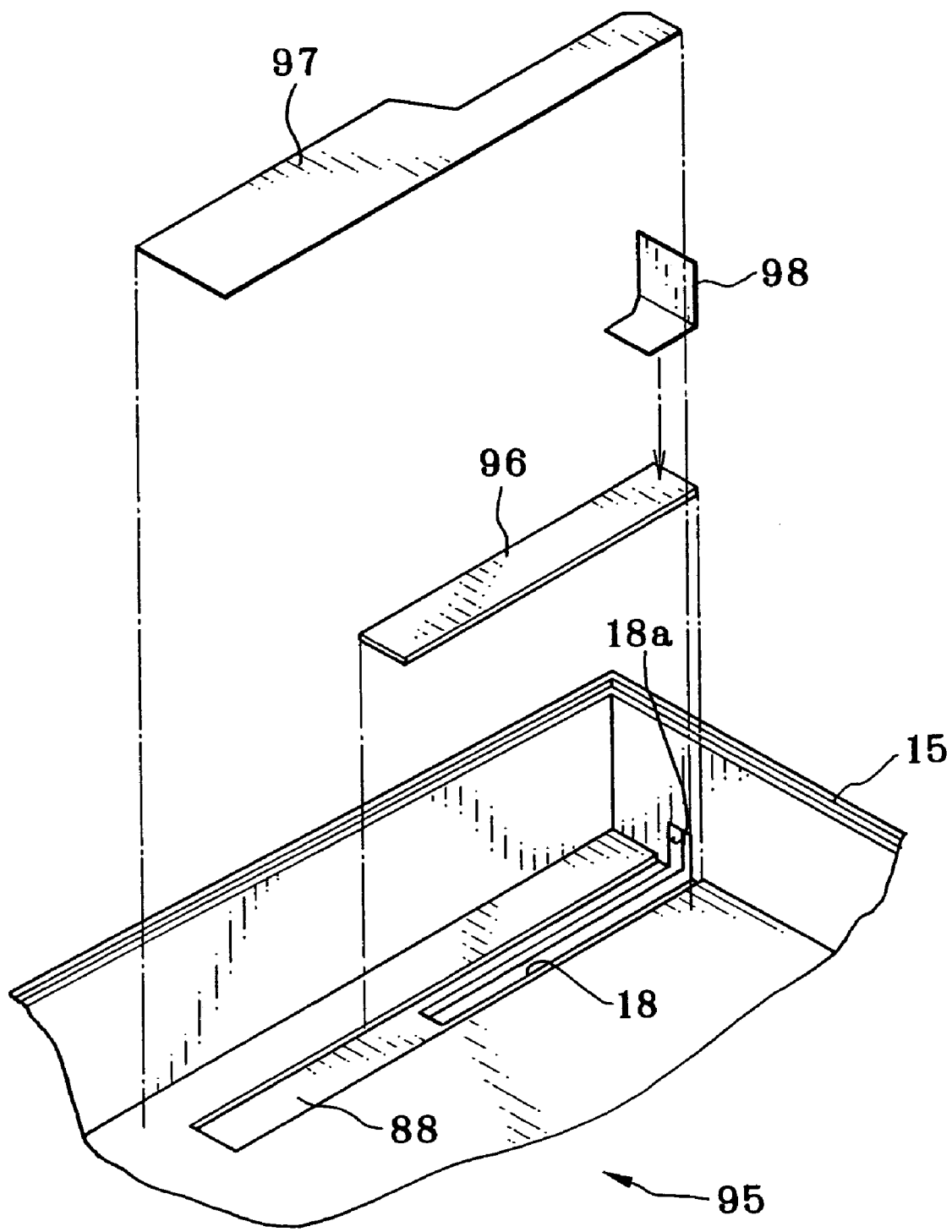
FIG. 20 is a perspective view, partially cutaway, illustrating a light shielding plate retained by a retention sheet.
Figure 21A:
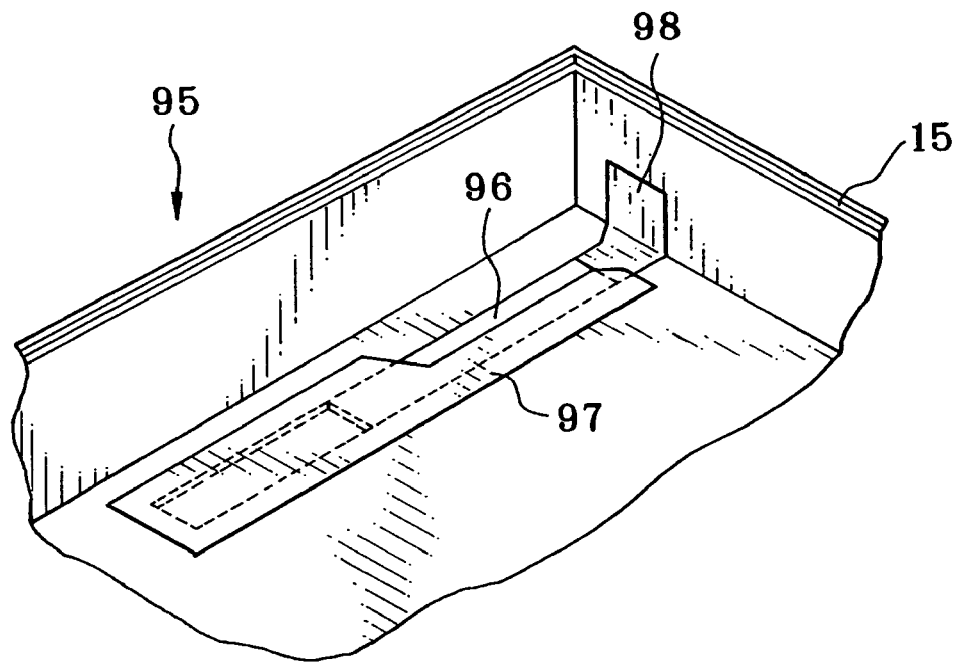
FIG. 21A is a perspective view, partially cutaway, illustrating the light shielding plate in a closed state.
Figure 21B:
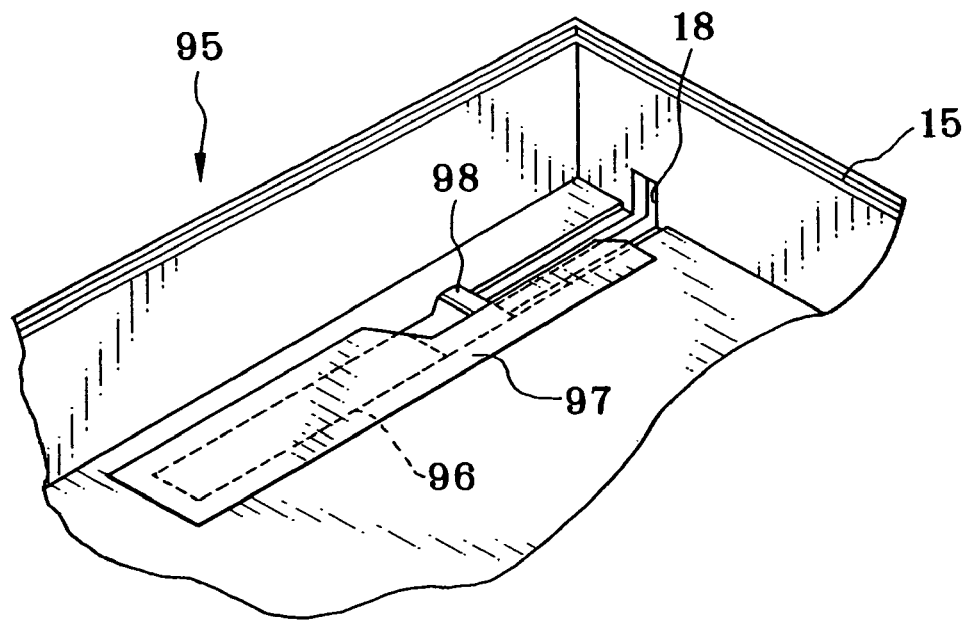
FIG. 21B is a perspective view, partially cutaway, illustrating the light shielding plate in an open state.

In the above embodiment, the light shielding plate 89 is secured to the case body 15 by means of the sliding projections 92. A further preferred instant film pack 95 is illustrated in FIGS. 20, 21A and 21B, in which a retention sheet 97 is attached to a lower panel of the case body 15 in a form to cover a light shielding plate 96 and keep the same slidable. This is effective in retaining the light shielding plate 96 with the retention sheet 97. No incidental exposure or fogging of the instant photo film 3 occurs due to an excessively loosened state of the light shielding plate 96. Note that a light shielding sheet or skirt 98 is secured to the light shielding plate 96 and closes the claw entrance 18a of the claw path opening 18.

Figure 22:
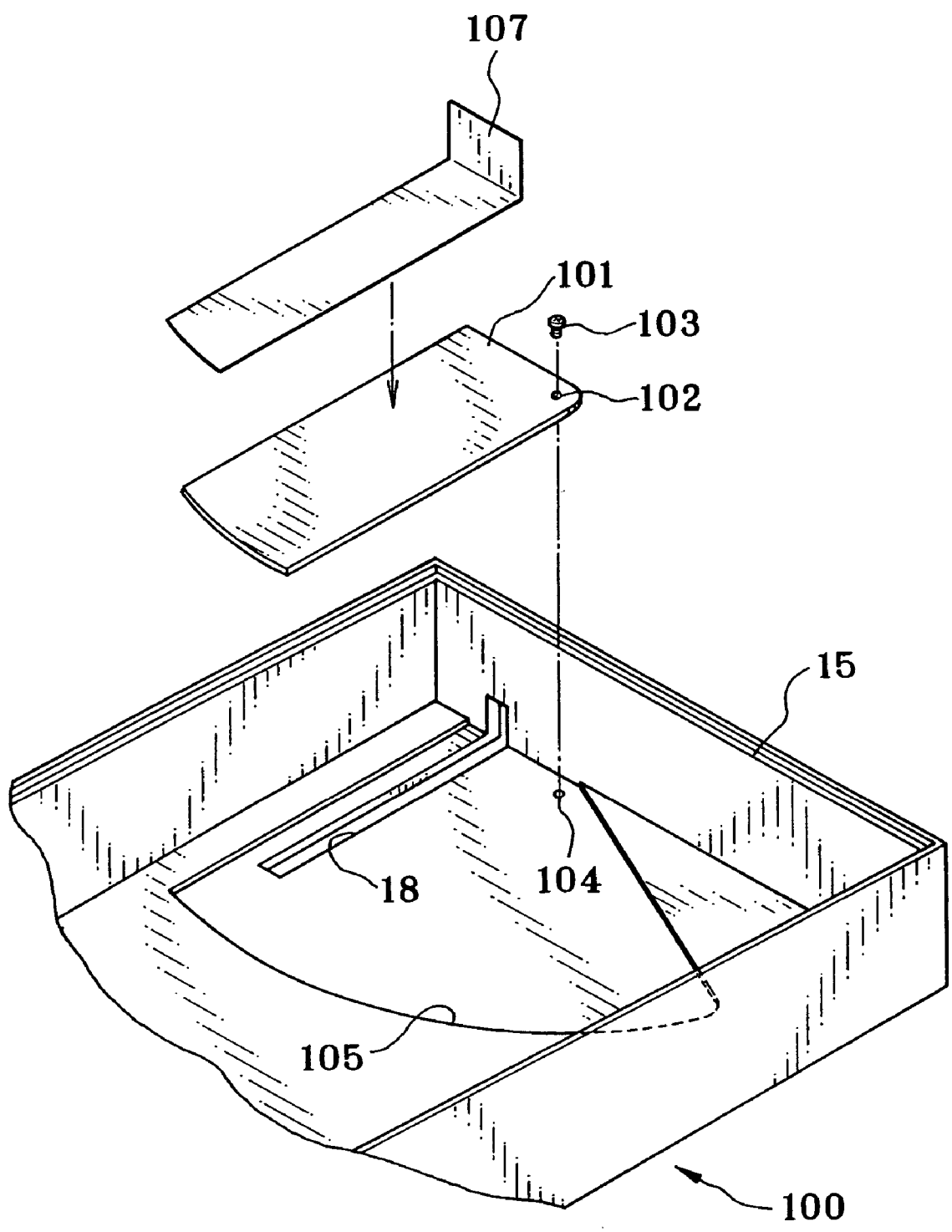
FIG. 22 is a perspective view, partially cutaway, illustrating a light shielding plate for opening the claw opening.

In the above embodiments, the light shielding plate slidable in the advancing direction of the advancing claw is provided. However, an instant film pack 100 may have a light shielding plate 101 for being rotated by movement of the advancing claw mechanism 42. See FIG. 22. A receiving recess 105 is formed in the lower panel of the case body 15, disposed about the claw path opening 18 for containing the light shielding plate 101. A through hole 102 is formed at a corner of the light shielding plate 101. A fastening screw 103 is inserted in the through hole 102. A screw hole 104 is formed in the lower panel of the case body 15, and helically engaged with the fastening screw 103, so as to keep the light shielding plate 101 rotatable on the case body 15. A light shielding sheet or skirt 107 is disposed on an upper face of the light shielding plate 101 for preventing entry of ambient light to the claw entrance 18a of the claw path opening 18 and the periphery of the light shielding plate 101.

Figure 23A:
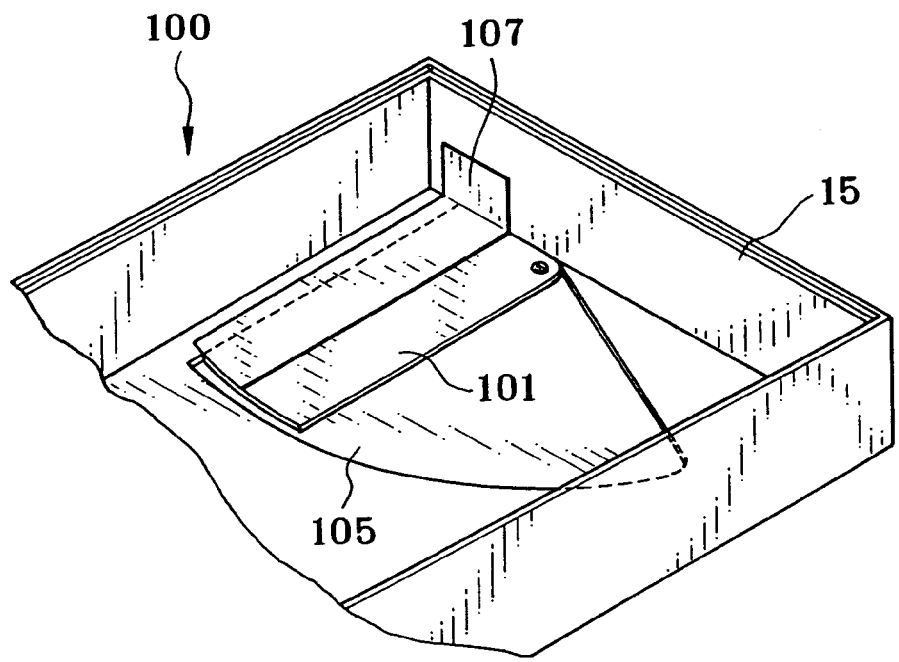
FIG. 23A is a perspective view, partially cutaway, illustrating a rotatable light shielding plate in a closed state.
Figure 23B:
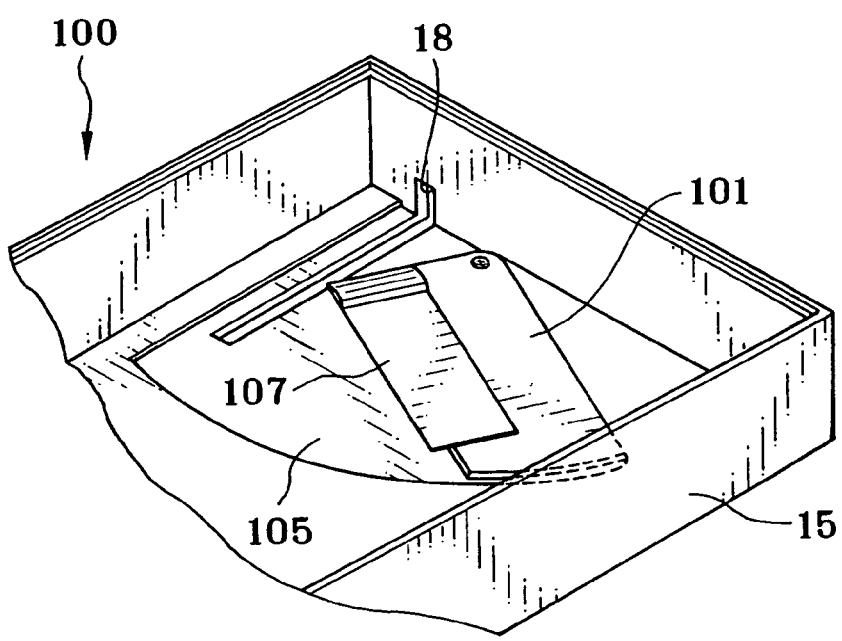
FIG. 23B is a perspective view, partially cutaway, illustrating the rotatable light shielding plate in an open state.

While the instant film pack 100 is unused, the light shielding plate 101 is disposed to extend in the photo film moving direction. See FIG. 23A. The light shielding plate 101 closes the claw path opening 18. When an optical printer is loaded with the instant film pack 2, the advancing claw mechanism 42 initially moves for the advance of the photo film. At this time, a rear end of the light shielding plate 101 becomes engaged with the advancing claw mechanism 42. In FIG. 23B, the light shielding plate 101 rotates in the counterclockwise direction. Therefore, the claw path opening 18 becomes open without being closed. When the advancing claw mechanism 42 moves further, a lowest one of the instant photo films 3 comes to advance.

Figure 24:
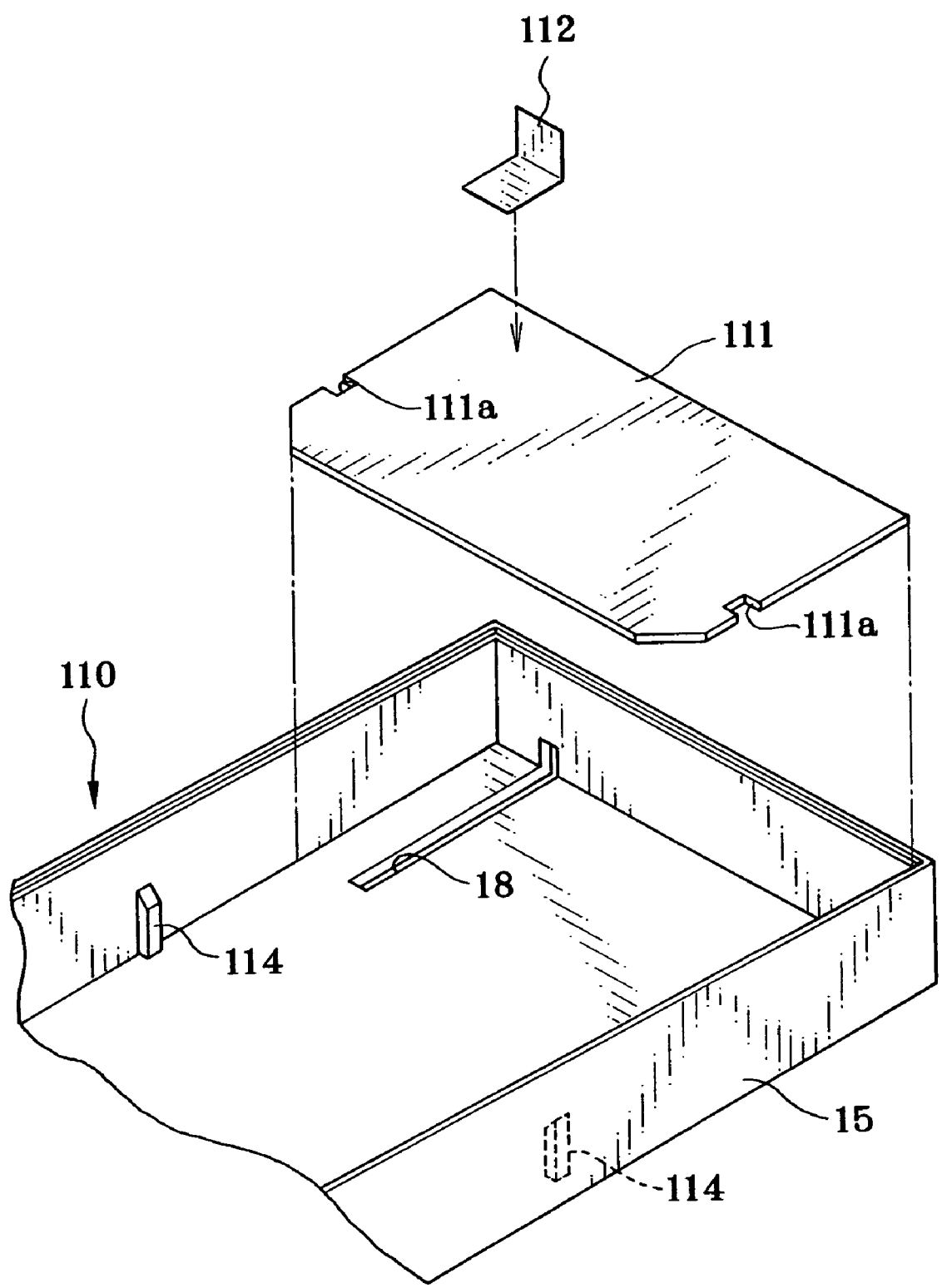
FIG. 24 is an exploded perspective view, partially cutaway, illustrating a light shielding plate with a large area.

In the above embodiments, the light shielding plates have a somewhat small size. However, an instant film pack 110 may have a light shielding plate 111 having an area extending in the full width of the case body 15. See FIG. 24. A light shielding sheet or skirt 112 is secured to the light shielding plate 111 for preventing entry of ambient light to the claw entrance 18a of the claw path opening 18.

Figure 25A:
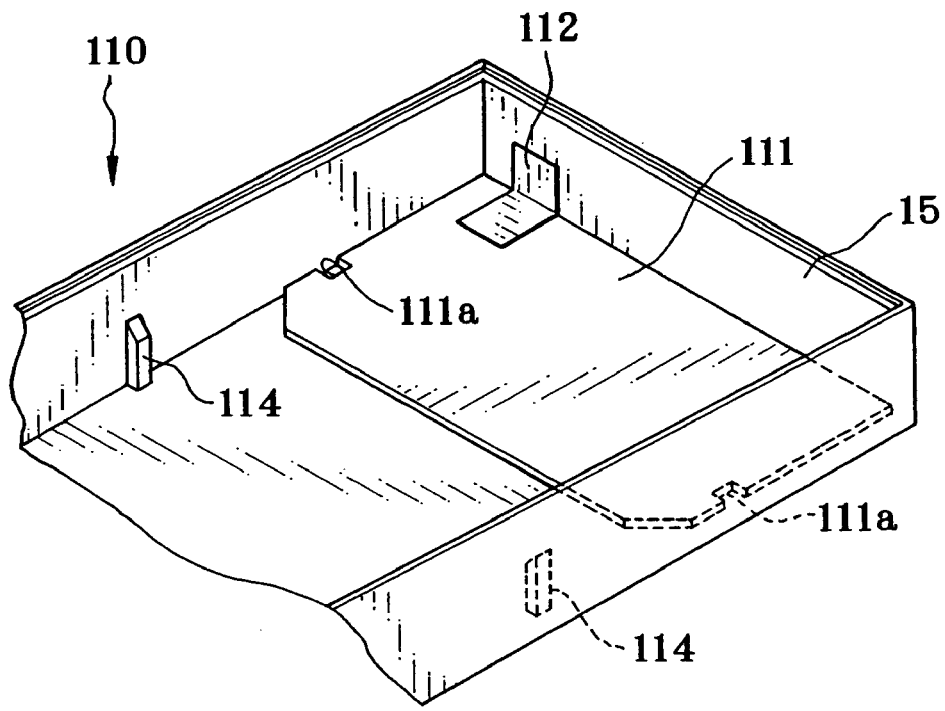
FIG. 25A is a perspective view, partially cutaway, illustrating the light shielding plate in a closed state.
Figure 25B:
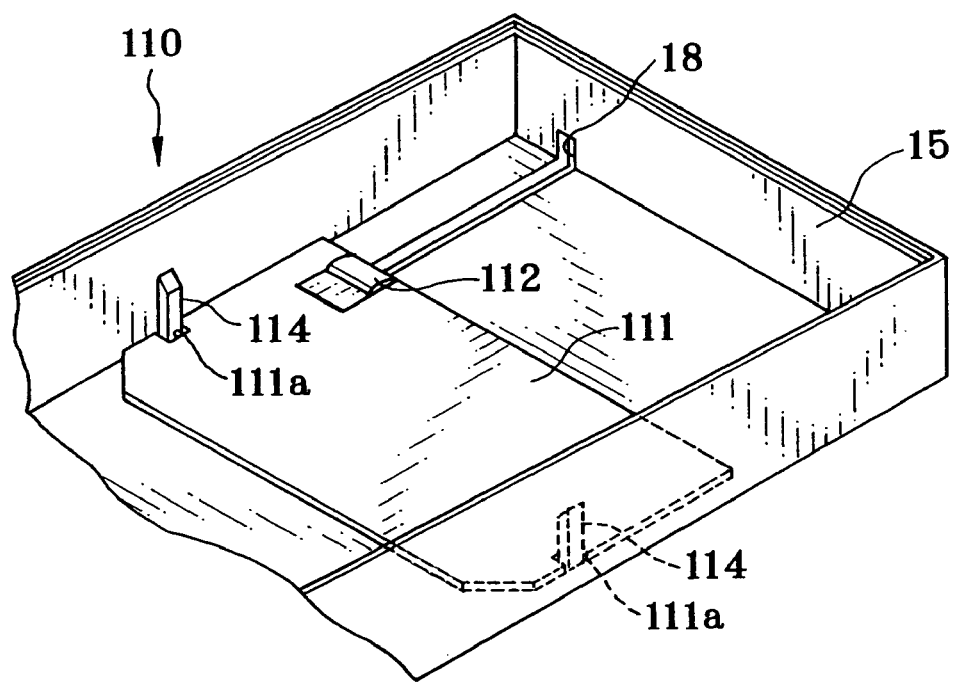
FIG. 25B is a perspective view, partially cutaway, illustrating the light shielding plate in an open state.

In FIG. 25A, the light shielding plate 111 is located in the rear position of the case body 15, and closes the claw path opening 18 when the instant film pack 110 is unused. When the optical printer is loaded with the instant film pack 2, the advancing claw mechanism 42 initially moves and captures the light shielding plate 111, and slides the light shielding plate 111 toward the front of the case body 15 as illustrated in FIG. 25B. Thus, the claw path opening 18 appears in an uncovered state. Next movement of the advancing claw mechanism 42 pushes a lowest one of the instant photo films 3.

The light shielding plate 111 has a considerable weight, and is likely to close the claw path opening 18 incidentally if shifting a body of the optical printer moves the light shielding plate 111 to the rear of the case body 15. In consideration of this, a cutout 111a is formed in each edge of the light shielding plate 111. There are side ridges 114 of the case body 15. When the light shielding plate 111 comes to the open position, the light shielding plate 111 can be engaged with the side ridges 114.

Figure 26:
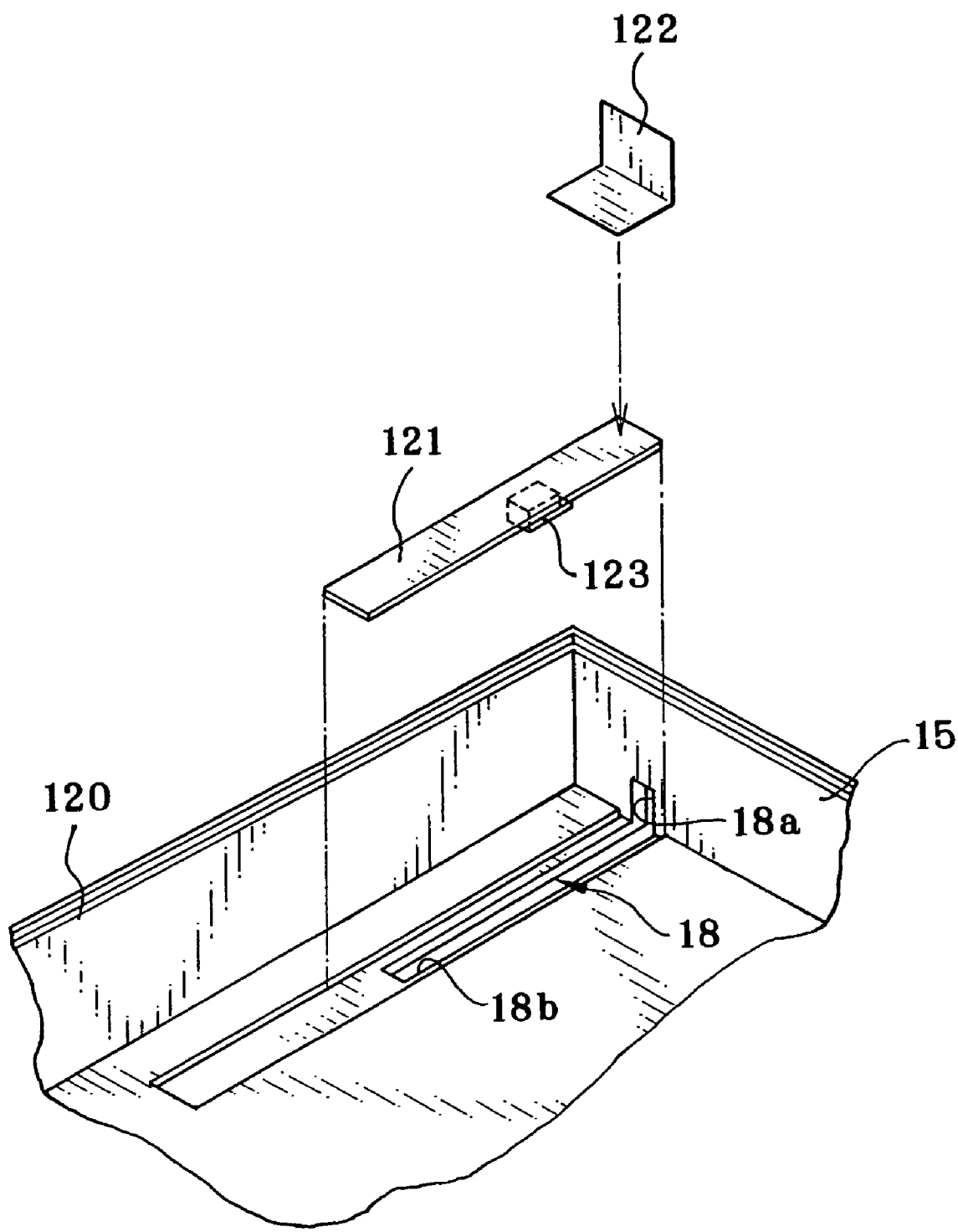
FIG. 26 is a perspective view, partially cutaway, illustrating a light shielding plate sliding at the same time as photo film advance.

In contrast with the above embodiments, it is possible to move the light shielding plate at the same time as advance of the photo film. In FIG. 26, one instant film pack 120 is illustrated, in which a light shielding plate 121 or path light shielding element closes the claw sliding slot 18b of the claw path opening 18. A light shielding sheet or skirt 122 is attached to an end of an upper face of the light shielding plate 121, and closes the claw entrance 18a. A sliding projection 123 projects from a lower face of the light shielding plate 121, and is received in the claw sliding slot 18b in a slidable manner.

Figure 27A:
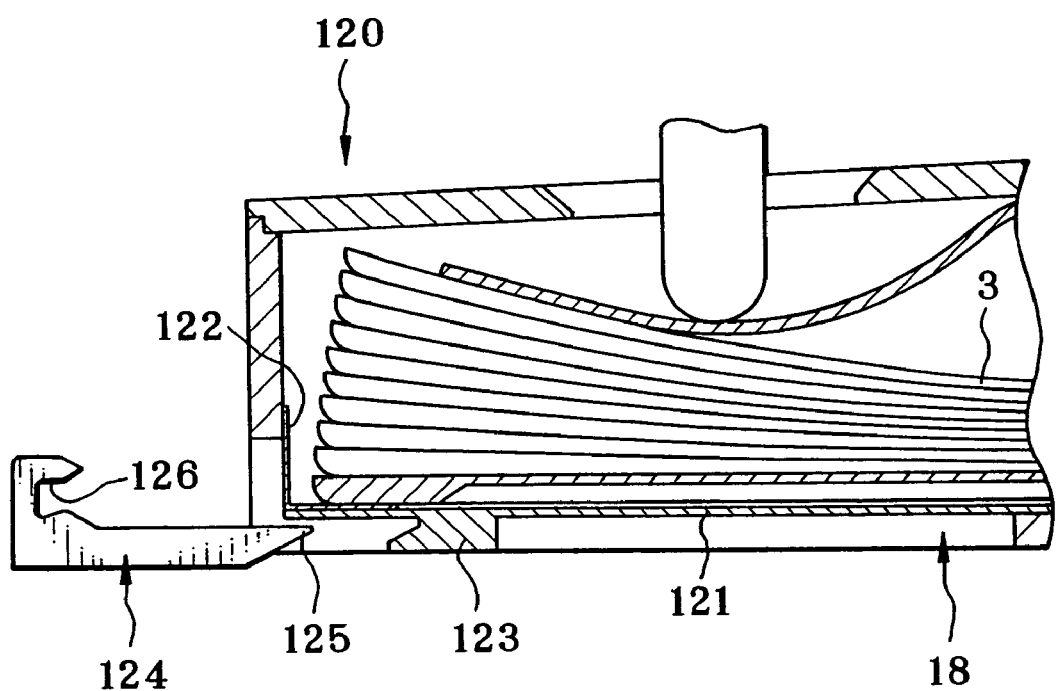
FIG. 27A is an explanatory view in section, illustrating the light shielding plate in a closed state.

The light shielding plate 121 at the time before use of the instant film pack 120 is disposed in the rear space of the case body 15 as illustrated in FIG. 27A, and closes the claw path opening 18. When an optical printer is loaded with the instant film pack 2, an advancing claw mechanism 124 operates for initial advance of the photo film. A pushing end 125 of the advancing claw mechanism 124 is engaged with the sliding projection 123 of the light shielding plate 121, and moves in the advancing direction. Thus, the claw path opening 18 is opened.

Figure 27B:
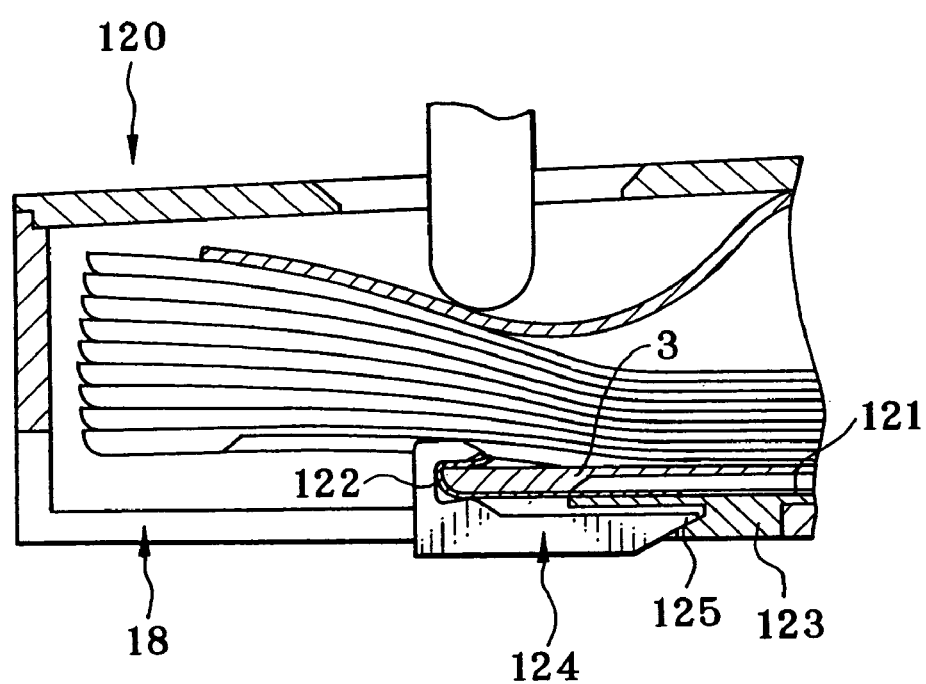
FIG. 27B is an explanatory view in section, illustrating the light shielding plate in an open state.

In FIG. 27B, an engagement hook 126 of the advancing claw mechanism 124 comes to enter the claw path opening 18 being open, captures an end of the instant photo film 3, and pushes the same toward the exit slot 17. This is effective in producing a print immediately after loading of the pack, because the initial capture of the advancing claw mechanism 124 can advance the light shielding plate and the lowest instant photo film at the same time.

Figure 28:
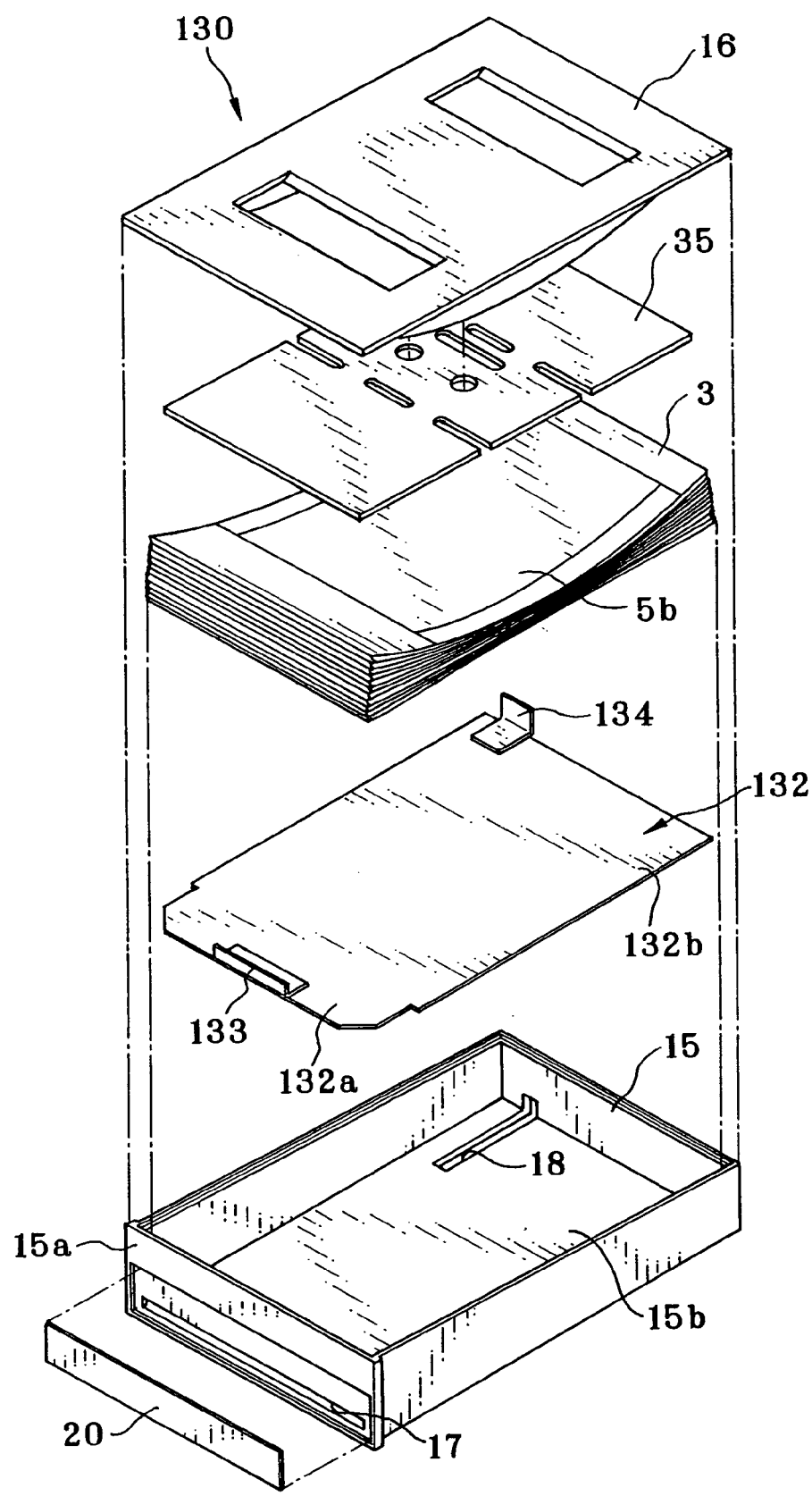
FIG. 28 is an exploded perspective view illustrating an instant film pack with instant photo films stacked in another preferred sequence.

In the above embodiments, the instant photo films 3 are stacked in such a sequence that the photosensitive layer 5b is directed downwards. In FIG. 28, another instant film pack 130 is illustrated, where the instant photo films 3 are stacked to direct the photosensitive layer 5b upwards in the case body 15. The instant photo films 3 are used in such a sequence that a lower one of those is exposed earlier than upper ones.

Figure 29A:
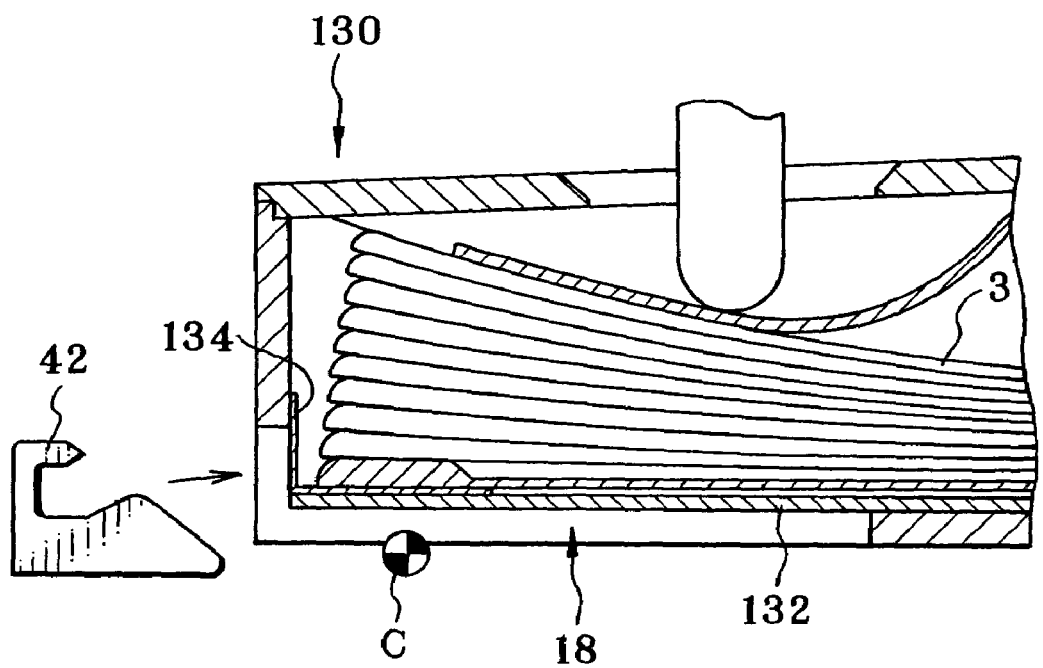
FIG. 29A is an explanatory view in section, illustrating a light shielding plate with a large area in a closed state.
Figure 30A:
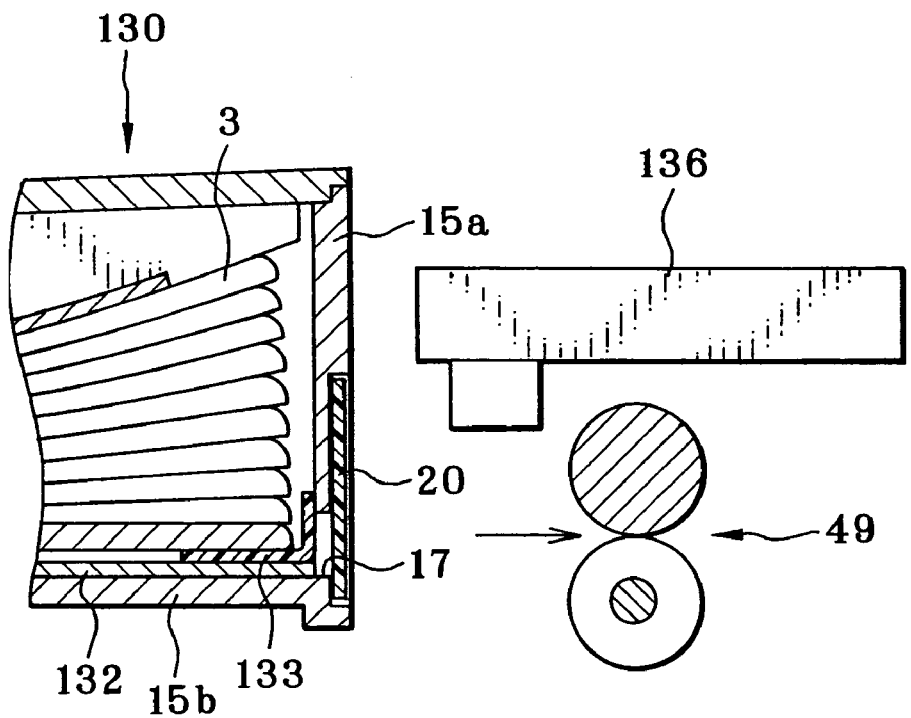
FIG. 30A is an explanatory view in section, illustrating the same as FIGS. 29A and 29B but in a state before advance.

In the instant film pack 130, a light shielding plate 132 has as large a size as that of the instant photo film 3. It is possible to attach a thrust preventing flap 133 or stopper and a light shielding sheet 134 or path light shielding element to the light shielding plate 132. In FIG. 29A, the light shielding plate 132 is located in the rear region of the case body 15 while the instant film pack 130 is unused, and closes the claw path opening 18 together with the light shielding sheet 134. In FIG. 30A, the exit slot 17 is closed by the light shielding flap 20 to block entry of ambient light. The thrust preventing flap 133 is disposed on the inside of the exit slot 17, and prevents the light shielding plate 132 and the instant photo film 3 from thrusting toward the outside.

An optical printer for use with the instant film pack 130 according to the embodiment has an exposure head 136 disposed higher than a transporting path of the photo films because the photosensitive layer 5*b* of the instant photo films 3 is directed upwards.

Figure 29B:
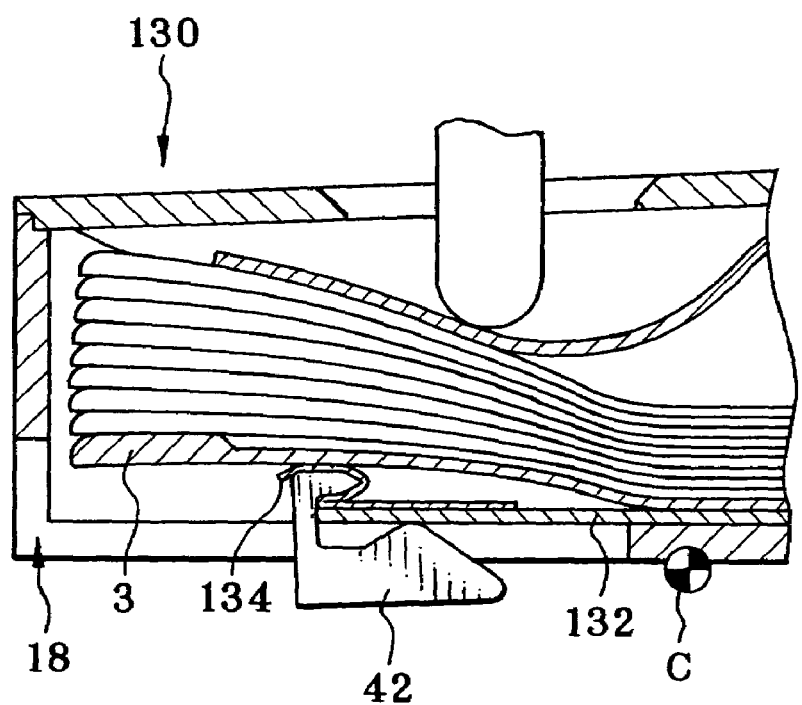
FIG. 29B is an explanatory view in section, illustrating the same as FIG. 29A but in an open state.
Figure 31:
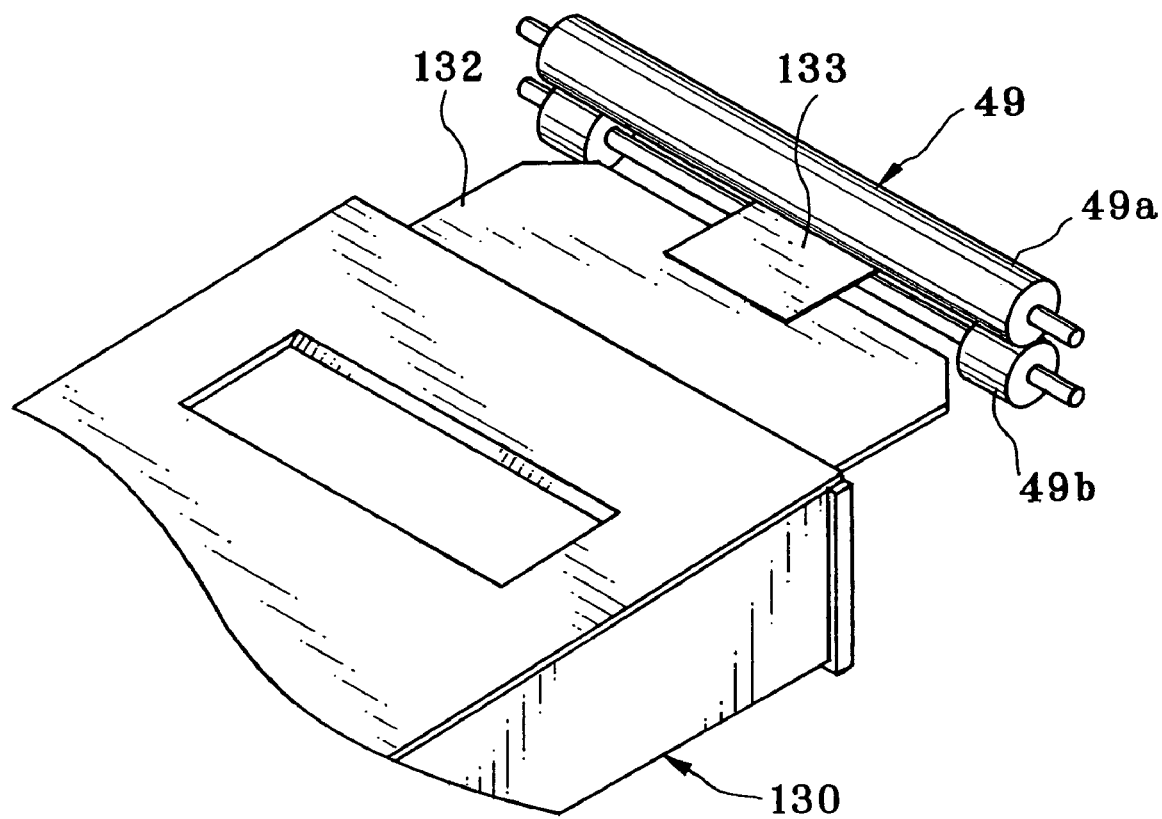
FIG. 31 is a perspective view, partially cutaway, illustrating an instant film pack having a light shielding plate capable of guiding instant photo films.

In FIG. 29B, upon loading of an optical printer with the instant film pack 130, the advancing claw mechanism 42 becomes engaged with the light shielding plate 132, and moves the same toward the front of the case body 15. In FIG. 31, the light shielding plate 132 is moved externally from the case 4 through the exit slot 17 together with the thrust preventing flap 133. However, a rear end portion 132*b* of the light shielding plate 132 has a greater range than a front end portion 132*a* in a direction crosswise to the movement. The rear end portion 132*b* has such a size that the rear end portion 132*b* does not pass the exit slot 17. Therefore, the light shielding plate 132 is stopped in a state of protruding the front end portion 132*a* from the exit slot 17.

The light shielding plate 132 protruded from the case 4 has its front end which has reached the vicinity of the feed roller set 49. However, the side rolls of the lower roller 49*b* of the feed roller set 49 are only positioned at end positions. Corners of the light shielding plate 132 are cut off. Thus, there is no nipping of the light shielding plate 132 with the feed roller set 49.

Figure 30B:
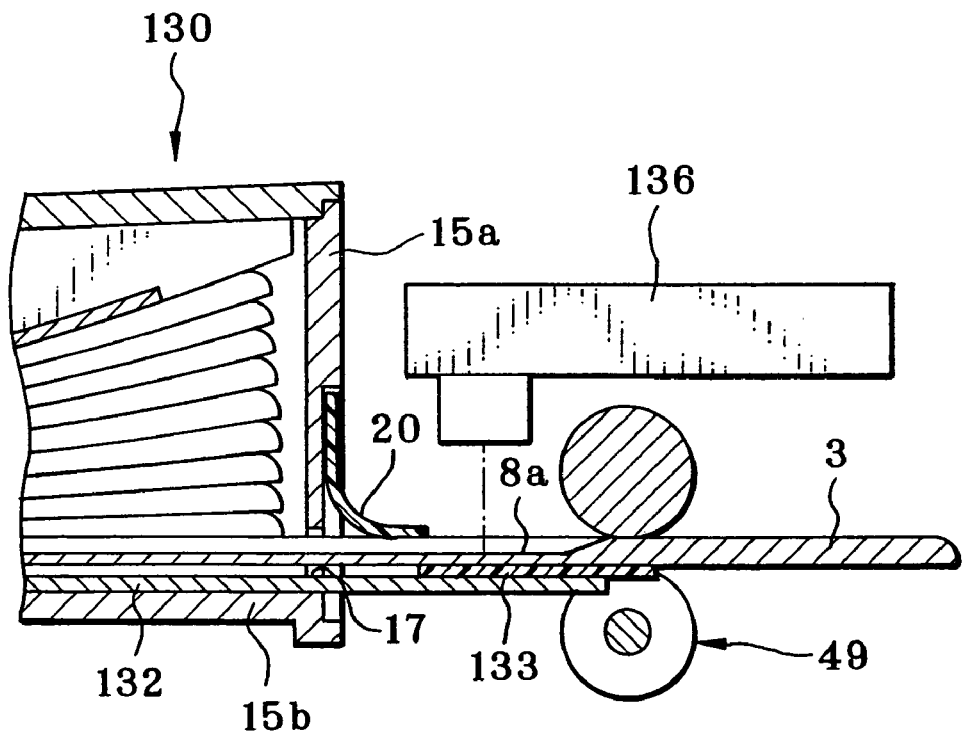
FIG. 30B is an explanatory view in section, illustrating the same as FIGS. 29A and 29B but in an advancing state.

In FIG. 30B, a second moving operation of the advancing claw mechanism 42 advances a lowest one of the instant photo films 3 and moves the same through the exit slot 17. When the photosensitive layer 5*b* reaches the exposure head 136, printing light is applied to the photosensitive layer 5*b*. The light shielding plate 132 of which the end portion protrudes is effective as a guiding mechanism for guiding the instant photo film 3 from the exit slot 17 toward the feed roller set 49. There is no occurrence of jamming of the instant photo film 3 or no failure of being nipped in the feed roller set 49. Also, the light shielding plate 132 is kept from exiting unlike the known type of instant film pack. This is effective in suppressing increase in the amount of waste.

In the above embodiments, the particular partial structures may be suitably combined with one another, including the positions and conditions of attaching the thrust preventing flaps, the light shielding methods of the claw path opening, the sequence of the instant photo films 3 being stacked. Also, the instant film pack may contain instant photo films of a negative type instead of those of the positive type.

It is to be noted that an instant film pack of the present invention can be used for an instant camera. Also, a pack of the invention may be a recording medium pack including a case and containing plural sheets of recording media having photosensitivity.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant film pack, including a plurality of instant photo films, a case for containing said instant photo films being stacked, an exit slot, formed in said case, for exiting said instant photo films to an outside of said case one after another, and a claw path opening, formed in said case, for receiving insertion of an advancing claw mechanism for advancing said instant photo films by one photo film to move to said exit slot, said instant film pack comprising:
    a path light shielding structure for closing said claw path opening in a light-tight manner, and for being released to open said claw path opening upon advance of said advancing claw mechanism, for advancing a first one of said plurality of instant photo films,
    wherein said path light shielding structure is of an easily breakable material, and is attached by adhesion to said claw path opening, and
    wherein said easily breakable material comprises aluminum foil.

2. An instant film pack, including a plurality of instant photo films, a case for containing said instant photo films being stacked, an exit slot, formed in said case, for exiting said instant photo films to an outside of said case one after another, and a claw path opening, formed in said case, for receiving insertion of an advancing claw mechanism for advancing said instant photo films by one photo film to move to said exit slot, said instant film pack comprising:
    a path light shielding structure for closing said claw path opening in a light-tight manner, and for being released to open said claw path opening upon advance of said advancing claw mechanism, for advancing a first one of said plurality of instant photo films,
    wherein said path light shielding structure is of an easily breakable material, and is attached by adhesion to said claw path opening, and
    wherein said easily breakable material comprises a plastic film of which breaking is facilitated in at least one breaking direction that is set in an advancing direction of said advancing claw mechanism.

3. An instant film pack, including a plurality of instant photo films, a case for containing said instant photo films being stacked, an exit slot, formed in said case, for exiting said instant photo films to an outside of said case one after another, and a claw path opening, formed in said case, for receiving insertion of an advancing claw mechanism for advancing said instant photo films by one photo film to move to said exit slot, said instant film pack comprising:
    a path light shielding structure for closing said claw path opening in a light-tight manner, and for being released to open said claw path opening upon advance of said advancing claw mechanism, for advancing a first one of said plurality of instant photo films
    wherein said claw path opening includes:
    a claw entrance, formed in a rear panel of said case, for allowing entry of said advancing claw mechanism into said case; and
    a claw sliding slot, formed in a lower panel of said case to extend in a direction of advance of said advancing claw mechanism;
    wherein said path light shielding structure comprises a flexible sheet, and is attached by adhesion to a periphery of said claw sliding slot; and
    wherein said flexible sheet is attached to said claw sliding slot in an adhesive region disposed to extend in a shape defined peripherally about said claw sliding slot.

4. An instant film pack, including a plurality of instant photo films, a case for containing said instant photo films being stacked, an exit slot, formed in said case, for exiting said instant photo films to an outside of said case one after another, and a claw path opening, formed in said case, for receiving insertion of an advancing claw mechanism for advancing said instant photo films by one photo film to move to said exit slot, said instant film pack comprising:
    a path light shielding structure for closing said claw path opening in a light-tight manner, and for being released to open said claw path opening upon advance of said advancing claw mechanism, for advancing a first one of said plurality of instant photo films
    wherein said claw path opening includes:

a claw entrance, formed in a rear panel of said case, for allowing entry of said advancing claw mechanism into said case; and a claw sliding slot, formed in a lower panel of said case to extend in a direction of advance of said advancing claw mechanism;

wherein said path light shielding structure comprises a flexible sheet, and is attached by adhesion to a periphery of said claw sliding slot, wherein said flexible sheet is attached to said lower panel in a first adhesive region disposed close to an end of said claw sliding slot with reference to a direction of said advance, and wherein said flexible sheet is further attached to said case in a spot-shaped, second adhesive region disposed on said lower panel, and said second adhesive region is positioned between said first adhesive region and said rear panel.

5. An instant film pack, including a plurality of instant photo films, a case for containing said instant photo films being stacked, an exit slot, formed in said case, for exiting said instant photo films to an outside of said case one after another, and a claw path opening, formed in said case, for receiving insertion of an advancing claw mechanism for advancing said instant photo films by one photo film to move to said exit slot, said instant film pack comprising:

a path light shielding structure for closing said claw path opening in a light-tight manner, and for being released to open said claw path opening upon advance of said advancing claw mechanism, for advancing a first one of said plurality of instant photo films wherein said claw path opening includes:

a claw entrance, formed in a rear panel of said case, for allowing entry of said advancing claw mechanism into said case; and a claw sliding slot, formed in a lower panel of said case to extend in a direction of advance of said advancing claw mechanism;

wherein said path light shielding structure includes:

a light shielding plate movable from a closed position to an open position, for closing said claw sliding slot when in said closed position, and for opening said claw sliding slot when in said open position;

a light shielding sheet, secured to said light shielding plate, for closing said claw entrance in a light-tight manner when said light shielding plate is in said closed position, and for opening said claw entrance when said light shielding plate is in said open position;

wherein said light shielding plate is moved from said closed position to said open position by said advance of said advancing claw mechanism, wherein said light shielding plate is slid in said advancing direction of said advancing claw mechanism, the instant film pack further comprising a sliding projection, disposed to project from said light shielding plate, engaged with said case in said claw sliding slot, for keeping said light shielding plate slidable along said claw sliding slot.

6. An instant film pack as defined in claim 5, further comprising a retention sheet, attached to said lower panel of said case, for covering said light shielding plate being in said closed position.

7. An instant film pack as defined in claim 5, wherein said light shielding plate extends from a first lateral panel of said case to a second lateral panel thereof;

further comprising a stopper, formed on said lateral panels, for retaining said light shielding plate in said open position.

8. An instant film pack, including a plurality of instant photo films, a case for containing said instant photo films being stacked, an exit slot, formed in said case, for exiting said instant photo films to an outside of said case one after another, and a claw path opening, formed in said case, for receiving insertion of an advancing claw mechanism for advancing said instant photo films by one photo film to move to said exit slot, said instant film pack comprising:

a path light shielding structure for closing said claw path opening in a light-tight manner, and for being released to open said claw path opening upon advance of said advancing claw mechanism, for advancing a first one of said plurality of instant photo films wherein said claw path opening includes:

a claw entrance, formed in a rear panel of said case, for allowing entry of said advancing claw mechanism into said case; and a claw sliding slot, formed in a lower panel of said case to extend in a direction of advance of said advancing claw mechanism;

wherein said path light shielding structure includes:

a light shielding plate movable from a closed position to an open position, for closing said claw sliding slot when in said closed position, and for opening said claw sliding slot when in said open position;

a light shielding sheet, secured to said light shielding plate, for closing said claw entrance in a light-tight manner when said light shielding plate is in said closed position, and for opening said claw entrance when said light shielding plate is in said open position;

wherein said light shielding plate is moved from said closed position to said open position by said advance of said advancing claw mechanism, and wherein said light shielding plate is pushed and rotated by said advancing claw mechanism, to open said claw path opening.

9. An instant film pack as defined in claim 8, further comprising a thrust preventing stopper, secured to said light shielding plate, disposed on an inside of said exit slot, for closing said exit slot at least partially, to prevent said instant photo films from coming through said exit slot.

10. An instant film pack as defined in claim 8, wherein said light shielding plate has a front end portion, and is kept from moving when said front end portion exited from said exit slot, so as to guide exiting of said instant photo films.

* * * * *